(12) United States Patent
Garner et al.

(10) Patent No.: US 12,114,041 B2
(45) Date of Patent: Oct. 8, 2024

(54) USING MOTION AND PRESENCE OF AN END-USER IN AND OUT OF A MONITORED ENVIRONMENT TO TRIGGER AN ACTION AT AN INTERNET OF THINGS DEVICE

(71) Applicant: Roku, Inc., San Jose, CA (US)

(72) Inventors: Greg Garner, San Jose, CA (US); David Stern, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/884,722

(22) Filed: Aug. 10, 2022

(65) Prior Publication Data
US 2024/0056633 A1 Feb. 15, 2024

(51) Int. Cl.
*H04N 21/2187* (2011.01)
*G11B 27/00* (2006.01)
*H04N 21/433* (2011.01)
*H04N 21/442* (2011.01)
*H04N 21/472* (2011.01)

(52) U.S. Cl.
CPC ..... *H04N 21/44218* (2013.01); *G11B 27/005* (2013.01); *H04N 21/2187* (2013.01); *H04N 21/4334* (2013.01); *H04N 21/47217* (2013.01)

(58) Field of Classification Search
CPC ......... H04N 21/44218; H04N 21/2187; H04N 21/4334; H04N 21/47217; G11B 27/005
See application file for complete search history.

(56) References Cited

U.S. PATENT DOCUMENTS

| | | | |
|---|---|---|---|
| 11,202,121 B2 | 12/2021 | Neerbek et al. | |
| 2015/0382047 A1 | 12/2015 | Van Os | |
| 2016/0007288 A1 | 1/2016 | Samardzija | |
| 2019/0208270 A1* | 7/2019 | Bates | H04N 21/43615 |
| 2019/0356505 A1* | 11/2019 | Madden | H04L 12/2834 |
| 2020/0356160 A1* | 11/2020 | Kosugi | G06F 1/3231 |
| 2021/0279549 A1 | 9/2021 | Spanos et al. | |
| 2021/0327234 A1* | 10/2021 | Chandramowle | G06Q 20/208 |
| 2021/0360318 A1 | 11/2021 | Neerbek et al. | |
| 2021/0360533 A1 | 11/2021 | Neerbek et al. | |
| 2022/0295134 A1* | 9/2022 | Bhide | G16Y 10/75 |
| 2022/0345569 A1 | 10/2022 | Swerdlow | |

* cited by examiner

*Primary Examiner* — Thai Q Tran
*Assistant Examiner* — Jose M Mesa
(74) *Attorney, Agent, or Firm* — McDonnell Boehnen Hulbert & Berghoff LLP

(57) ABSTRACT

In one aspect, a method includes using a Wi-Fi module of a computing device to detect that an end-user has exited a monitored environment of the computing device, where the monitored environment comprises an Internet of Things (IoT) device communicatively coupled to the computing device over an IoT network. The method also involves in response to detecting that the end-user has exited the monitored environment, triggering a first IoT action at the IoT device. The method also involves after detecting that the end-user has exited the monitored environment and triggering the first IoT action, using the Wi-Fi module of the computing device to detect that the end-user has reentered the monitored environment. The method also involves in response to detecting that the end-user has reentered the monitored environment, triggering a second IoT action at the IoT device.

20 Claims, 10 Drawing Sheets

USING MOTION AND PRESENCE OF AN END-USER IN AND OUT OF A MONITORED ENVIRONMENT TO TRIGGER AN ACTION AT AN INTERNET OF THINGS DEVICE

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method includes using a Wi-Fi module of a computing device to detect that an end-user has entered a monitored environment of the computing device, where the computing device is separate from, and communicatively coupled over an Internet of Things (IoT) network to, a battery-powered IoT device. The method also includes, in response to detecting that the end-user has entered the monitored environment of the computing device, causing the IoT device to switch from operating in a standby mode to instead operating in an active mode, where operation in the standby mode comprises a mode in which the IoT device consumes less power than when operating in the active mode.

In another aspect, a non-transitory computer-readable storage medium has stored thereon program instructions that, upon execution by a processor, cause performance of a set of operations. The set of operations includes using a Wi-Fi module of a computing device to detect that an end-user has entered a monitored environment of the computing device, where the computing device is separate from, and communicatively coupled over an Internet of Things (IoT) network to, a battery-powered IoT device. The set of operations also includes in response to detecting that the end-user has entered the monitored environment of the computing device, causing the IoT device to switch from operating in a standby mode to instead operating in an active mode, wherein operation in the standby mode comprises a mode in which the IoT device consumes less power than when operating in the active mode.

In another aspect, a system includes a processor and a non-transitory computer-readable storage medium, having stored thereon program instructions that, upon execution by the processor, cause performance of a set of operations. The set of operations includes using a Wi-Fi module of a computing device to detect that an end-user has entered a monitored environment of the computing device, where the computing device is separate from, and communicatively coupled over an Internet of Things (IoT) network to, a battery-powered IoT device. The set of operations also includes in response to detecting that the end-user has entered the monitored environment of the computing device, causing the IoT device to switch from operating in a standby mode to instead operating in an active mode, wherein operation in the standby mode comprises a mode in which the IoT device consumes less power than when operating in the active mode.

In another aspect, a method includes using one or more Wi-Fi modules of one or more computing devices to detect movement of an end-user from a first monitored environment of the one or more computing devices to a second, different monitored environment of the one or more computing devices, where the first monitored environment comprises a first Internet of Things (IoT) device, where the second monitored environment comprises a second IoT device, and where the first and second IoT devices are communicatively coupled to the one or more computing devices over an IoT network. The method also includes in response to detecting the movement of the end-user from the first monitored environment to the second monitored environment: triggering a first IoT action at the first IoT device, and triggering a second IoT action at the second IoT device.

In another aspect, a non-transitory computer-readable storage medium has stored thereon program instructions that, upon execution by a processor, cause performance of a set of operations. The set of operations includes using one or more Wi-Fi modules of one or more computing devices to detect movement of an end-user from a first monitored environment of the one or more computing devices to a second, different monitored environment of the one or more computing devices, where the first monitored environment comprises a first Internet of Things (IoT) device, where the second monitored environment comprises a second IoT device, and where the first and second IoT devices are communicatively coupled to the one or more computing devices over an IoT network. The set of operations also includes in response to detecting the movement of the end-user from the first monitored environment to the second monitored environment: triggering a first IoT action at the first IoT device, and triggering a second IoT action at the second IoT device.

In another aspect, a system includes a processor and a non-transitory computer-readable storage medium, having stored thereon program instructions that, upon execution by the processor, cause performance of a set of operations. The set of operations includes using one or more Wi-Fi modules of one or more computing devices to detect movement of an end-user from a first monitored environment of the one or more computing devices to a second, different monitored environment of the one or more computing devices, where the first monitored environment comprises a first Internet of Things (IoT) device, where the second monitored environment comprises a second IoT device, and where the first and second IoT devices are communicatively coupled to the one or more computing devices over an IoT network. The set of operations also includes in response to detecting the movement of the end-user from the first monitored environment to the second monitored environment: triggering a first IoT action at the first IoT device, and triggering a second IoT action at the second IoT device.

In another aspect, a method includes using a Wi-Fi module of a computing device to detect that an end-user has exited a monitored environment of the computing device, where the monitored environment of the computing device comprises an Internet of Things (IoT) device communicatively coupled to the computing device over an IoT network. The method also includes in response to detecting that the end-user has exited the monitored environment of the computing device, triggering a first IoT action at the IoT device. The method also includes after detecting that the end-user has exited the monitored environment of the computing device and triggering the first IoT action, using the Wi-Fi module of the computing device to detect that the end-user has reentered the monitored environment of the computing device. The method also includes in response to detecting that the end-user has reentered the monitored environment of the computing device, triggering a second IoT action at the IoT device.

In another aspect, a non-transitory computer-readable storage medium has stored thereon program instructions that, upon execution by a processor, cause performance of a set of operations. The set of operations includes using a Wi-Fi module of a computing device to detect that an end-user has exited a monitored environment of the computing device, where the monitored environment of the computing device comprises an Internet of Things (IoT) device communicatively coupled to the computing device over an IoT network. The set of operations also includes in response to detecting that the end-user has exited the monitored environment of the computing device, triggering a first IoT action at the IoT device. The set of operations also includes after detecting that the end-user has exited the monitored environment of the computing device and triggering the first IoT action, using the Wi-Fi module of the computing device to detect that the end-user has reentered the monitored environment of the computing device. The set of operations also includes in response to detecting that the end-user has reentered the monitored environment of the computing device, triggering a second IoT action at the IoT device.

In another aspect, a system includes a processor and a non-transitory computer-readable storage medium, having stored thereon program instructions that, upon execution by the processor, cause performance of a set of operations. The set of operations includes using a Wi-Fi module of a computing device to detect that an end-user has exited a monitored environment of the computing device, where the monitored environment of the computing device comprises an Internet of Things (IoT) device communicatively coupled to the computing device over an IoT network. The set of operations also includes in response to detecting that the end-user has exited the monitored environment of the computing device, triggering a first IoT action at the IoT device. The set of operations also includes after detecting that the end-user has exited the monitored environment of the computing device and triggering the first IoT action, using the Wi-Fi module of the computing device to detect that the end-user has reentered the monitored environment of the computing device. The set of operations also includes in response to detecting that the end-user has reentered the monitored environment of the computing device, triggering a second IoT action at the IoT device.

In another aspect, a method includes while an Internet of Things (IoT) device is playing out media content, using a Wi-Fi module of a computing device to detect that an end-user is present in a monitored environment of the computing device, where the monitored environment of the computing device comprises the IoT device, where the IoT device is communicatively coupled to the computing device over an IoT network, and where the IoT device is configured by default to operate in a first mode in which after a predefined time period has passed without the IoT device receiving end-user input, the IoT device displays a prompt for the end-user to indicate whether the end-user is present. The method also includes in response to detecting the predefined time period has passed without the IoT device receiving end-user input, and further in response to detecting that the end-user is present in the monitored environment of the computing device while the IoT device is playing out the media content, triggering the IoT device to switch from operating in the first mode to instead operating in a second mode in which the IoT device does not display the prompt for the end-user to indicate whether the end-user is present.

In another aspect, a non-transitory computer-readable storage medium has stored thereon program instructions that, upon execution by a processor, cause performance of a set of operations. The set of operations includes while an Internet of Things (IoT) device is playing out media content, using a Wi-Fi module of a computing device to detect that an end-user is present in a monitored environment of the computing device, where the monitored environment of the computing device comprises the IoT device, where the IoT device is communicatively coupled to the computing device over an IoT network, and where the IoT device is configured by default to operate in a first mode in which after a predefined time period has passed without the IoT device receiving end-user input, the IoT device displays a prompt for the end-user to indicate whether the end-user is present. The set of operations also includes in response to detecting the predefined time period has passed without the IoT device receiving end-user input, and further in response to detecting that the end-user is present in the monitored environment of the computing device while the IoT device is playing out the media content, triggering the IoT device to switch from operating in the first mode to instead operating in a second mode in which the IoT device does not display the prompt for the end-user to indicate whether the end-user is present.

In another aspect, a system includes a processor and a non-transitory computer-readable storage medium, having stored thereon program instructions that, upon execution by the processor, cause performance of a set of operations. The set of operations includes while an Internet of Things (IoT) device is playing out media content, using a Wi-Fi module of a computing device to detect that an end-user is present in a monitored environment of the computing device, where the monitored environment of the computing device comprises the IoT device, where the IoT device is communicatively coupled to the computing device over an IoT network, and where the IoT device is configured by default to operate in a first mode in which after a predefined time period has passed without the IoT device receiving end-user input, the IoT device displays a prompt for the end-user to indicate whether the end-user is present. The set of operations also includes in response to detecting the predefined time period has passed without the IoT device receiving end-user input, and further in response to detecting that the end-user is present in the monitored environment of the computing device while the IoT device is playing out the media content, triggering the IoT device to switch from operating in the first mode to instead operating in a second mode in which the IoT device does not display the prompt for the end-user to indicate whether the end-user is present.

In another aspect, a method includes while an Internet of Things (IoT) device is playing out media content: using a Wi-Fi module of a computing device to detect that an end-user is present in a monitored environment of the computing device, where the monitored environment of the computing device comprises the IoT device, and where the IoT device is communicatively coupled to the computing device over an IoT network, and while detecting that the end-user is present in the monitored environment of the computing device, detecting that a predefined time period has passed without the IoT device receiving end-user input. The method also includes in response to detecting that the end-user is present in the monitored environment of the computing device and further in response to detecting that the predefined time period has passed without the IoT device receiving end-user input, triggering the IoT device to display a prompt for the end-user to indicate whether the end-user is present.

In another aspect, a non-transitory computer-readable storage medium has stored thereon program instructions that, upon execution by a processor, cause performance of a set of operations. The set of operations includes while an Internet of Things (IoT) device is playing out media content:

using a Wi-Fi module of a computing device to detect that an end-user is present in a monitored environment of the computing device, where the monitored environment of the computing device comprises the IoT device, and where the IoT device is communicatively coupled to the computing device over an IoT network, and while detecting that the end-user is present in the monitored environment of the computing device, detecting that a predefined time period has passed without the IoT device receiving end-user input. The set of operations also includes in response to detecting that the end-user is present in the monitored environment of the computing device and further in response to detecting that the predefined time period has passed without the IoT device receiving end-user input, triggering the IoT device to display a prompt for the end-user to indicate whether the end-user is present.

In another aspect, a system includes a processor and a non-transitory computer-readable storage medium, having stored thereon program instructions that, upon execution by the processor, cause performance of a set of operations. The set of operations includes while an Internet of Things (IoT) device is playing out media content: using a Wi-Fi module of a computing device to detect that an end-user is present in a monitored environment of the computing device, where the monitored environment of the computing device comprises the IoT device, and where the IoT device is communicatively coupled to the computing device over an IoT network, and while detecting that the end-user is present in the monitored environment of the computing device, detecting that a predefined time period has passed without the IoT device receiving end-user input. The set of operations also includes in response to detecting that the end-user is present in the monitored environment of the computing device and further in response to detecting that the predefined time period has passed without the IoT device receiving end-user input, triggering the IoT device to display a prompt for the end-user to indicate whether the end-user is present.

DETAILED DESCRIPTION

I. Overview

Figure 1:
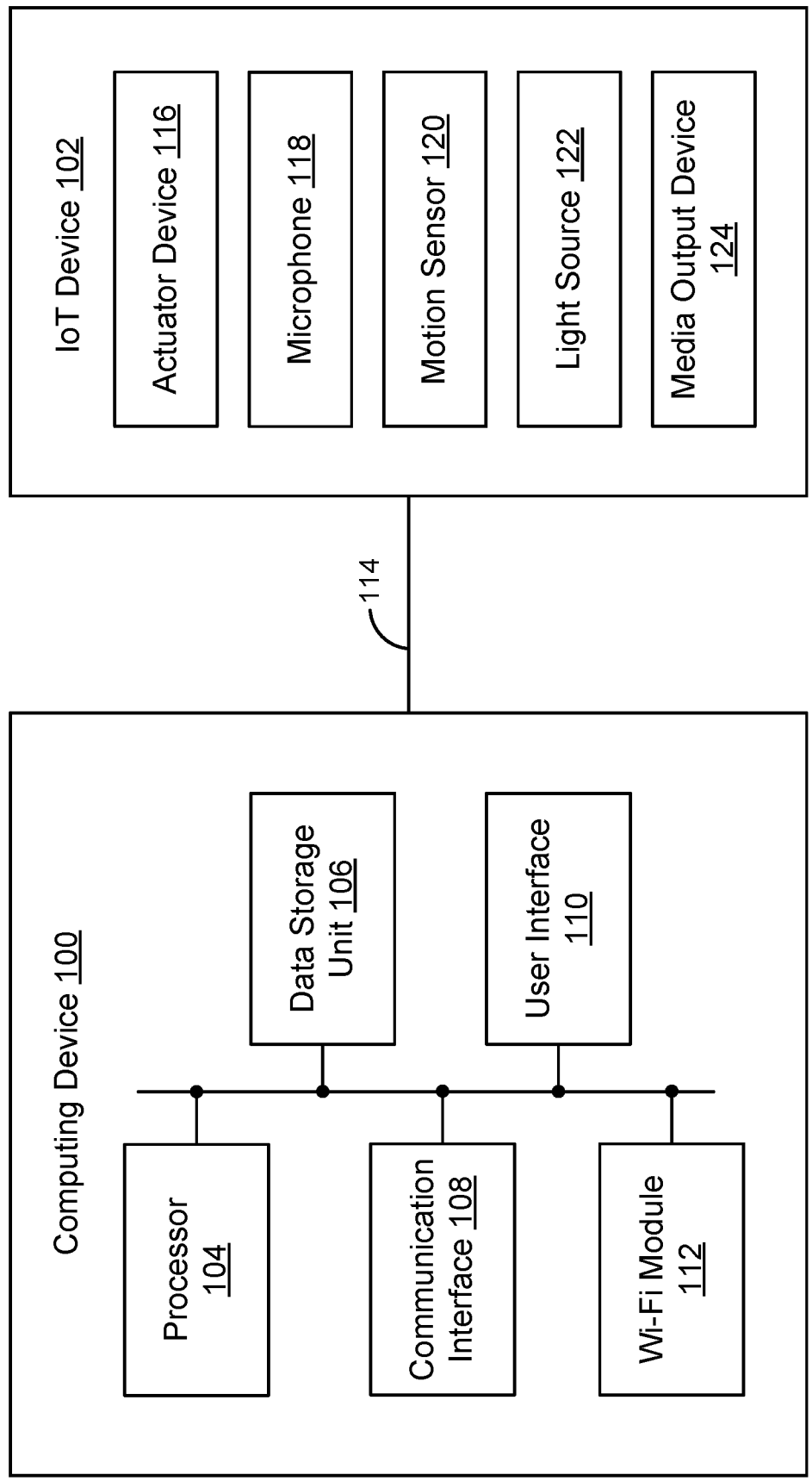
FIG. 1 is a simplified block diagram of an example computing device and IoT device with which various described principles can be implemented.

Modern end-user premises, such as homes (also referred to herein as "households"), hotels, or offices, are increasingly equipped with many devices that are configured to engage in internet communications. These devices may range from traditional internet-connected equipment such as personal computers, telephone systems, security systems, gaming systems, and over-the-top (OTT) streaming media players, to newer "Internet of Things (IoT)" devices including "smart home" devices such as connected appliances, utilities, lights, switches, power outlets, and speakers, as well as wearable devices such as watches and/or health monitors, among countless other examples. Such IoT devices can communicate with each other and share data over an IoT network, such as a local area network (LAN) or other type of computer network.

In some cases, such as in the context of a smart home, IoT devices can be used to enhance or otherwise usefully supplement end-user activities within the end-user's home, often by making typical home activities more efficient or more aesthetic. For example, the end-user may be able to remotely control a smart television, smart lights, or smart speakers within the end-user's home without having to manually interact with such devices.

To improve user experience, some IoT devices can be configured to perform certain actions depending on detected events or changes in a particular environment, such as when the end-user is present in a particular environment, and perhaps additionally when the end-user is moving in that environment. To facilitate this, for example, a computing device with which the IoT devices are in communication, or an IoT device itself, can include a Wi-Fi module and can be configured to use the Wi-Fi module to detect end-user presence and motion in a monitored environment of the computing device. Herein, a "monitored environment" can refer to an environment, such as a room of a house, within which a computing device is configured to detect/monitor at least the presence and motion of end-users via Wi-Fi and/or other information (e.g., other sensors and sensor data).

The Wi-Fi module can include at least a transmitter configured to transmit Wi-Fi signals at varying signal strengths (e.g., low power signals) as instructed by a local or remote processor. Transmitted Wi-Fi signals are then received by a receiver, such as a receiver present in the Wi-Fi module itself or another device that is part of the end-user's home network (e.g., a router, smart television, or mobile phone). The computing device can then use machine learning algorithms or other software to process the transmitted and received signals and determine various information, such as whether the end-user is present in the monitored environment, whether the end-user is moving, and the direction in which the end-user is moving, among other possibilities. The presence and motion of end-users in the monitored environment can change Wi-Fi signals between signal transmission and signal receipt, such as due to reflection of the signals off certain objects and surfaces and/or due to attenuation of the signals during propagation. Thus, processing the signals and analyzing these and other changes can facilitate end-user presence and motion detection. In some cases, Wi-Fi can be used alone or in conjunction with other technologies to determine other useful information as well, such as how many end-users are in the monitored environment, a size of an end-user, a direction the end-user is moving, a speed at which the end-user is moving, and/or a specific identity of the end-user.

Disclosed herein are methods and systems for using Wi-Fi-based end-user motion and presence detection to improve end-user experience with IoT devices and to improve the performance of the IoT devices themselves.

As an example, a detection that an end-user has entered a monitored environment can be used to cause a batteryoperated IoT device to switch from operating in a standby mode to instead operating in an active, low-power mode. As another example, a detection that an end-user has moved or is moving from one monitored environment to another can be used to trigger respective action at respective IoT devices in the environments. And as yet another example, a first action can be triggered at an IoT device upon detecting that the end-user has exited a monitored environment and a second action can be triggered at the IoT device upon subsequently detecting that the end-user has reentered the monitored environment. These and other examples are described in more detail below.

II. Example Computing Device and IoT Device

FIG. 1 is a simplified block diagram of an example computing device 100 and IoT device 102 with which various described principles can be implemented.

The computing device 100 can be configured to perform and/or can perform one or more operations, such as the operations described in this disclosure. The computing device 100 can include various components, such as a processor 104, a data-storage unit 106, a communication interface 108, a user interface 110, and/or a Wi-Fi module 112.

The processor 104 can be or include a general-purpose processor (e.g., a microprocessor) and/or a special-purpose processor (e.g., a digital signal processor). The processor 104 can execute program instructions included in the data-storage unit 106 as described below.

The data-storage unit 106 can be or include one or more volatile, non-volatile, removable, and/or non-removable storage components, such as magnetic, optical, and/or flash storage, and/or can be integrated in whole or in part with the processor 104. Further, the data-storage unit 106 can be or include a non-transitory computer-readable storage medium, having stored thereon program instructions (e.g., compiled or non-compiled program logic and/or machine code) that, upon execution by the processor 104, cause the computing device 100 and/or another computing device to perform one or more operations, such as the operations described in this disclosure. These program instructions can define, and/or be part of, a discrete software application.

In some instances, the computing device 100 can execute program instructions in response to receiving an input, such as an input received via the communication interface 108, the user interface 110, and/or the Wi-Fi module 112. The data-storage unit 106 can also store other data, such as any of the data described in this disclosure.

The communication interface 108 can allow the computing device 100 to connect with and/or communicate with another entity according to one or more protocols. Therefore, the computing device 100 can transmit data to, and/or receive data from, one or more other entities according to one or more protocols. In one example, the communication interface 108 can be or include a wired interface, such as an Ethernet interface or a High-Definition Multimedia Interface (HDMI). In another example, the communication interface 108 can be or include a wireless interface, such as a cellular or Wi-Fi interface. In some embodiments, the communication interface 108 can include the Wi-Fi module 112.

The user interface 110 can allow for interaction between the computing device 100 and an end-user of the computing device 100. As such, the user interface 110 can be or include an input component such as a keyboard, a mouse, a remote controller, a microphone, a remote controller, and/or a touch-sensitive panel. The user interface 110 can also be or include an output component such as a display device (which, for example, can be combined with a touch-sensitive panel) and/or a sound speaker.

The Wi-Fi module 112 can allow for transmission of Wi-Fi signals, and in some cases, the Wi-Fi module 112 can also allow for receipt of Wi-Fi signals. As such, the Wi-Fi module 112 can include a transceiver or transmitter.

The computing device 100 can also be communicatively coupled to the IoT device 102 by way of an IoT network 114, which is represented in FIG. 1 by the line connecting the computing device 100 to the IoT device 102. The connection between the computing device 100 and the IoT device 102 can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The IoT device 102 can take the form of a computing device, such as the computing device 100. The IoT device 102 can include one or more of the above-described components of the computing device 100 (e.g., a processor, data storage unit, and communication interface) and/or can include other various components, such as an actuator device 116, a microphone 118, a motion sensor 120, a light source 122, and/or a media output device 124. In some embodiments, the IoT device 102 can be a battery-powered IoT device and can thus include a battery.

The actuator device 116 can be or include a mechanical or electromechanical device, such as a pushbutton, that, when actuated, causes the IoT device 102 and/or the computing device 100 to perform an action. In embodiments where the IoT device 102 is a remote controller for a television set of set-top box, for instance, the actuator device 116 can take the form of a pushbutton.

The microphone 118 can allow for receiving incoming audio, such as a voice command from the end-user. In some cases, audio detected via the microphone 118 can cause the IoT device 102 or the computing device 100 to perform an action.

The motion sensor 120 can allow for detection of movement of the IoT device 102. As such, the motion sensor 120 can be or include a gyroscope and/or an accelerometer. In some cases, movement of the IoT device 102 detected by the motion sensor 120 can cause the IoT device 102 or the computing device 100 to perform an action.

The light source 122 can be configured to provide light into an environment (e.g., the monitored environment of the computing device 100). As such, the light source 122 can be or include a light-emitting device such as an array of light-emitting diodes (LEDs) or a light bulb. In some embodiments, the light source 122 can take the form of a backlight disposed underneath or behind the actuator device 116.

The media output device 124 can allow for the output of audio content and/or video content. As such, the media output device 124 can take the form of a display device (e.g., a television screen) and/or a speaker.

In some cases, the computing device 100 can take the form of a more specific type of computing device. For instance, the computing device 100 can take the form of a television set, a set-top box, a television set with an integrated set-top box, a desktop computer, a laptop, a tablet, or a mobile phone, among other possibilities.

Further, in some cases, the IoT device 102 can take the form of a more specific type of computing device. For instance, the computing device 100 can take the form of a television set, a set-top box, a television set with an integrated set-top box, a remote controller for a television set or set-top box, a desktop computer, a laptop, a tablet, a mobile phone, a home appliance (e.g., a refrigerator), a light or light array, a camera, or a speaker (e.g., a portable speaker, larger-scale floor speaker, or soundbar), among other possibilities.

In some cases, any of the components of the IoT device 102 can take the form of a computing device. That is, any such component can include any one or more of the components shown as part of computing device 100.

Notably, in practice, multiple computing devices and/or multiple IoT devices can be communicatively coupled over the IoT network 114, each of which can take a form that is the same as or similar to the computing device 100 and the IoT device 102 shown in FIG. 1, respectively.

III. Example Operations

The computing device 100, the IoT device 102, and/or components thereof can be configured to perform and/or can perform one or more operations. Examples of these operations and related features will now be described.

A. Using Motion and Presence of an End-User to Switch Operational Modes of an IoT Device The following operations relate to using motion and presence of an end-user to change an operational mode of an IoT device, particularly a battery-powered IoT device.

Figure 2:
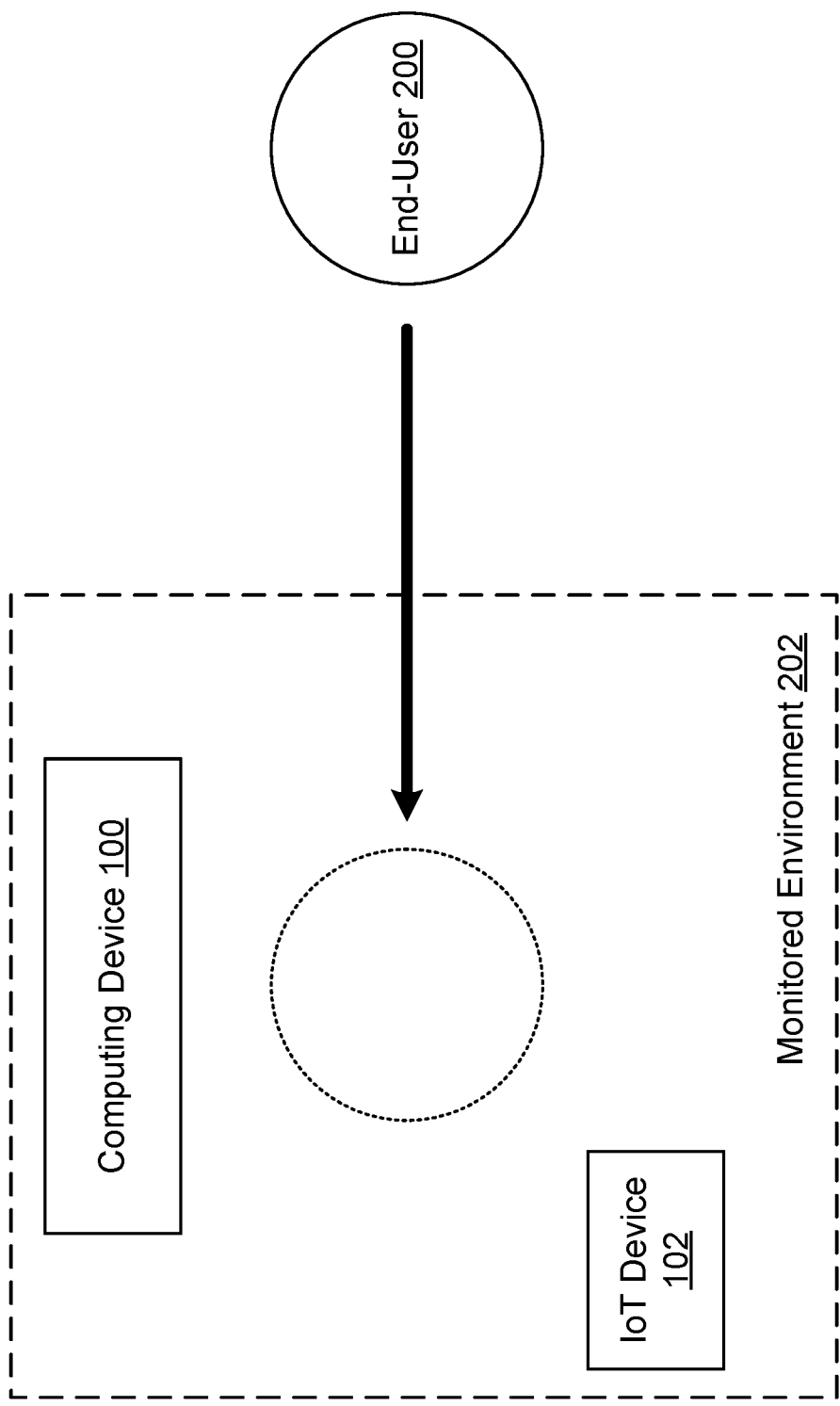
FIG. 2 depicts an example situation in which an end-user enters a monitored environment of a computing device.

FIG. 2 depicts an example situation in which an end-user 200 enters a monitored environment 202 of the computing device 100. As shown, the IoT device 102 is located within the monitored environment 202, but in some situations the IoT device 102 might be located outside of the monitored environment 202.

The computing device 100 can use the Wi-Fi module 112 to detect that the end-user 200 has entered the monitored environment 202 of the computing device 100, such as by using any Wi-Fi-based motion/presence detection process now known or later developed.

To facilitate Wi-Fi-based motion/presence detection, the computing device 100 can cause the Wi-Fi module 112 to transmit Wi-Fi signals into the monitored environment 202 (which the Wi-Fi module 112 might already be doing during the normal course of operation of the computing device 100). The computing device 100 can then process received Wi-Fi signals and, using machine learning algorithms and/or other techniques, including techniques now known or later developed, determine that the end-user 200 has entered the monitored environment 202 based at least in part on the transmitted and received Wi-Fi signals.

As a more particular example, signal paths for Wi-Fi signals transmitted into the monitored environment 202 have respective signatures representing how signals travel through a channel and how such signals are changed due to absorption or reflection by objects in the monitored environment 202. Thus, received Wi-Fi signals can be analyzed to determine characteristics of the channel, including any changes that occurred. If the end-user 200 enters the monitored environment 202, for instance, the computing device 100 can detect a disruption within the Wi-Fi field. In some cases, signal propagation delays and angles can also be determined and used to identify more specific information about the end-user 200, such as their position within the monitored environment 202. And in some cases, other data (e.g., radar data, lidar data, acoustic data, gyroscope data, accelerometer data, etc.) can be used in combination with Wi-Fi data to facilitate the detection of end-user motion and presence in the monitored environment 202.

In response to detecting that the end-user 200 has entered the monitored environment 202 of the computing device 100, the computing device 100 can cause the IoT device 102 to switch from operating in a standby mode to instead operating in an active mode, such as by transmitting an instruction to the IoT device 102. The standby mode can be a mode in which the IoT device 102 consumes less power than when operating in the active mode. Thus, the IoT device 102 can be usefully kept in a low power state in which the battery power of the IoT device 102 is being conserved until detecting that the end-user 200 has entered the monitored environment 202.

In some embodiments, the computing device 100 can perform the aforementioned operations while electrically connected to a wall outlet. As a more particular example, the aforementioned operations can be performed by a set-top box that is plugged in and typically always or almost always powered on. Because the set-top box is always or almost always powered on, the set-top box can be configured to always or almost always be scanning to detect end-user motion and presence in the monitored environment 202.

In some embodiments, the IoT device 102 can include an actuator device (e.g., actuator device 116). In such embodiments, the active mode can be a mode in which the IoT device 102 is configured to perform a first action in response to detecting actuation of the actuator device and the standby mode can be a mode in which, in addition to the IoT device 102 consuming less power, the IoT device 102 is configured to perform a second action, different from the first action, in response to detecting actuation of the actuator device. Specifically, the second action can be or include switching from operating in the standby mode to instead operating in the active mode. The first action can be or include any action that the IoT device 102 might typically perform while operating in the active mode, such as sending an instruction to the set-top box to change a channel in response to detecting that the end-user 200 has pushed a channel change button.

In an example, the IoT device 102 can take the form of a remote controller for a television set or set-top box and can include one or more pushbuttons. Typically in practice, such a remote controller can "wake up" (e.g., begin operating in the active mode) in response to the remote controller detecting that the end-user 200 has picked up the remote and/or pressed a button on the remote. This can sometimes result in button presses being missed by the remote controller. For instance, the end-user 200 might enter a room, pick up the remote controller, and press the power button for the television set. But because the remote controller might not be in the active mode until the power button is pressed, the remote controller might not register that the power button has been pressed the first time, and thus the end-user 200 might need to push the button again.

Thus, in line with the discussion above, it can be advantageous to have the remote controller operating in the standby mode so as to not consume too much power while not actively being used by the end-user 200. And then once the computing device 100 detects that the end-user 200 has entered the room (e.g., the monitored environment 202), the computing device 100 can instruct the remote controller to switch from the standby mode to the active mode, so that the remote controller is already in the active mode by the time the end-user 200 picks it up and/or presses a button. This can reduce the chance of missed button presses while the remote controller is still in the process of waking up.

In some embodiments, the IoT device 102 can include both an actuator device (e.g., actuator device 116) and a backlight (e.g., light source 122) disposed underneath the actuator device. In such embodiments, the standby mode can additionally be a mode in which the backlight is turned off, and the active mode can be a mode in which the backlight is turned on.

Referring again to the remote controller example, for instance, it can be useful to have the backlight turn on in response to detecting that the end-user 200 has entered the room so that the end-user 200 is able to clearly see the buttons on the remote controller right when the end-user 200 first picks up the remote controller, since the backlight can already be turned on by the time the end-user 200 picks up the remote controller. In contrast, a remote controller's backlight might typically not turn on until the end-user 200 picks up the remote controller and/or pushes a button on the remote controller.

In some embodiments, the IoT device 102 can include a microphone (e.g., microphone 118). In such embodiments, the standby mode can additionally be a mode in which the IoT device 102 is configured to perform an action in response to the microphone detecting a volume level of an incoming acoustic signal that is higher than a first predefined volume threshold, and the active mode can be a mode in which the IoT device 102 is configured to perform the action in response to the microphone detecting a volume level of an incoming acoustic signal that is higher than a second predefined volume threshold. The second predefined volume threshold can be higher than the first predefined volume threshold.

The action can be or include an action associated with operation of the IoT device 102. For example, if the IoT device 102 is a voice-enabled remote controller, the action can include processing a detected voice command from the end-user 200 to determine that the end-user 200 has requested a channel change to a particular channel and then transmitting an instruction to a set-top box to change to the particular channel. As another example, if the IoT device 102 is a voice-enabled speaker, the action can include processing a detected voice command from the end-user 200 to determine that the end-user 200 has requested playback of a particular song and then playing the particular song.

In some cases, the first predefined volume threshold and the second predefined volume threshold can be thresholds that are used by the IoT device 102 to determine whether a voice is present. Other types of thresholds related to voice detection are possible as well as alternative or additional thresholds that are changed depending on whether the IoT device 102 is operating in the standby mode or active mode. Further, in some cases, the first predefined volume threshold can be zero, such that the microphone of the IoT device 102 is turned off entirely or operating at lower power when no end-user is present in the monitored environment 202.

The same sort of concept can be applied with respect to a motion sensor of the IoT device 102 as well. Particularly, in some embodiments, the IoT device 102 can include a motion sensor, such as a gyroscope, accelerometer, radar sensor, lidar sensor, infrared sensor, etc. In such embodiments, the standby mode can additionally be a mode in which the IoT device 102 is configured to perform an action in response to the motion sensor detecting a motion signal that exceeds a first predefined motion threshold, and the active mode can be a mode in which the IoT device 102 is configured to perform the action in response to the motion sensor detecting a motion signal that exceeds a second predefined motion threshold that is higher than the first predefined motion threshold. The action can be or include an action associated with operation of the IoT device 102. For example, the action can include sending an instruction to a television to wake up the television.

Switching from the standby mode to the active mode in response to the end-user 200 entering the monitored environment 202 can be useful in relation to a "find my device" type of feature for the IoT device 102. Particularly, in some embodiments, the standby mode can additionally be a mode in which the IoT device 102 periodically wakes up at a first frequency (e.g., every thirty seconds, or not at all) to perform an action that facilitates identifying a location of the IoT device 102 within the monitored environment 202 to the end-user 200, and the active mode can be a mode in which the IoT device 102 periodically wakes up at a second frequency (e.g., every five seconds), higher than the first frequency, to perform the action that facilitates identifying the location of the IoT device 102 within the monitored environment 202 to the end-user 200. That is, when the end-user 200 is in the monitored environment 202 looking for the IoT device 102, the IoT device 102 will be in the active mode, waking up more frequently, whereas when the end-user 200 is not in the monitored environment 202, the IoT device 102 will be conserving power in the standby mode, waking up less frequently or not at all. Such functionality can achieve a desired balance of improving user experience and reducing power consumption.

In some embodiments, the IoT device 102 can be or include a camera. In such embodiments, the standby mode can additionally be a mode in which the camera is not recording footage of a camera-monitored environment, and the active mode can be a mode in which the camera is recording footage of the camera-monitored environment. That is, when the end-user 200 enters the monitored environment 202, the camera can responsively wake up and begin recording.

In some cases, the camera-monitored environment includes at least a portion of the monitored environment 202 or is the same environment. For instance, the camera can be located indoors in the same room of the end-user's home as the computing device 100. In other cases, such as those where the camera is located outside of the monitored environment 202 (e.g., a security camera located outside of the end-user's home, such as on the front porch or backyard), the camera-monitored environment and the monitored environment 202 can be different environments.

B. Using Movement of an End-User Between Monitored Environments to Trigger an Action at an IoT Device The following operations relate to using a detected transition of motion/presence of an end-user from one monitored environment to another monitored environment as a basis for triggering an IoT action at one or more IoT devices located in the monitored environments. Herein, an "IoT action" refers to one or more actions that an IoT device can perform in its respective monitored environment, and examples will be described in more detail below.

Further, the following operations are performed by one or more computing devices (e.g., computing device 100) and involve at least two monitored environments that are monitored by the one or more computing devices. Additionally, some operations relate to other environments, which may or might not be monitored by the one or more computing devices in the manner described above. Although a single computing device can be configured to monitor end-user motion and presence in multiple environments, examples described and illustrated herein with respect to the following operations, such as the example of FIG. 3, primarily involve computing device 100 monitoring a first monitored environment (i.e., monitored environment 202) and a second, different computing device 300 monitoring a second monitored environment 302.

Figure 3:
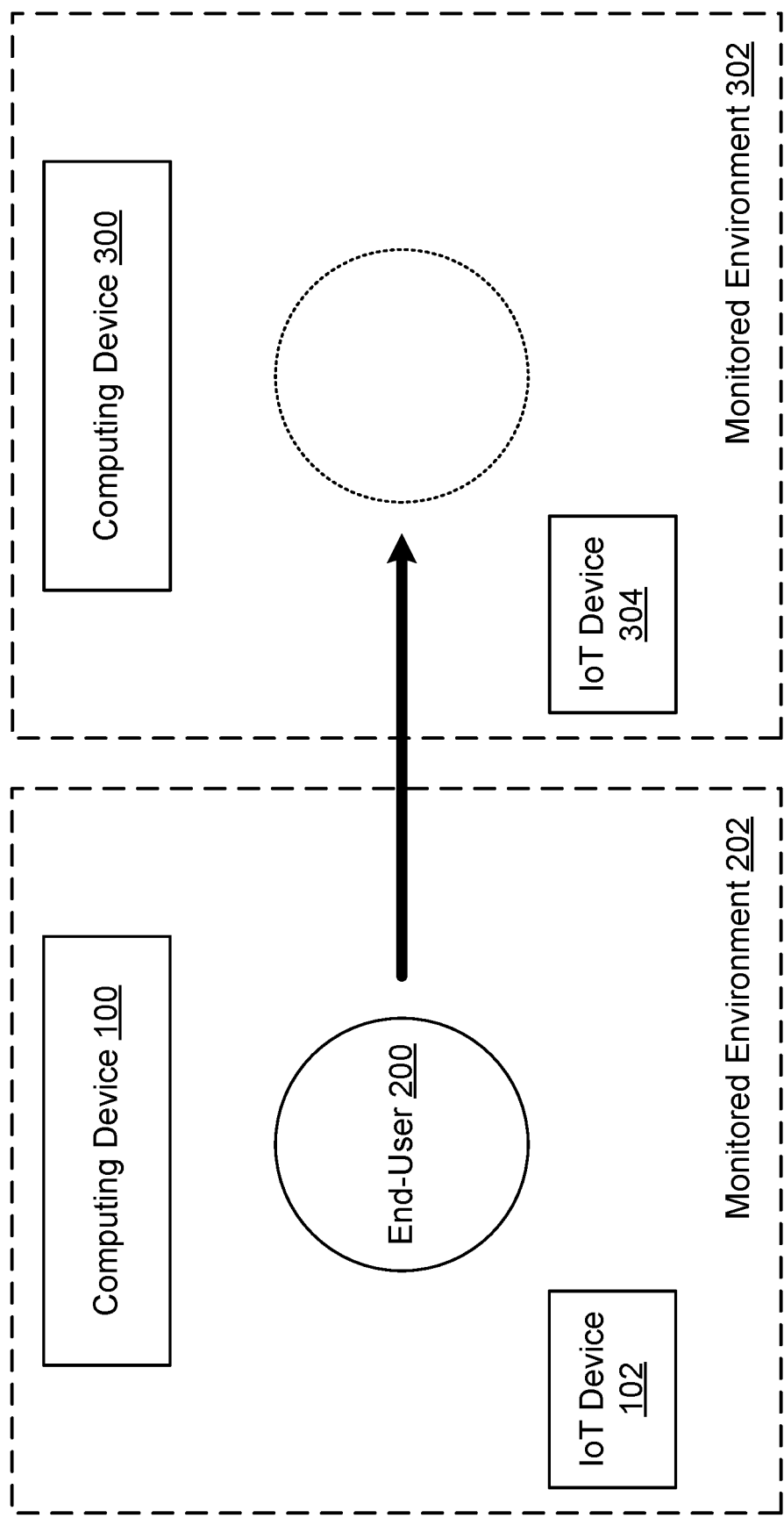
FIG. 3 depicts an example situation in which an end-user moves from a first monitored environment to a second, different monitored environment.

FIG. 3 depicts an example situation in which an end-user 200 moves from the first monitored environment 202 of the computing device 100 to the second monitored environment 302 of the second computing device 300. As shown, the IoT device 102 is located within the first monitored environment 202 and a second, different IoT device 304 is located within the second monitored environment 302.

The one or more computing devices (e.g., computing device 100 and/or computing device 300) can use the Wi-Fi module 112 to detect movement of the end-user 200 from the first monitored environment 202 to the second monitored environment 302, such as by using any Wi-Fi-based motion/presence detection process now known or later developed.

In some examples, the one or more computing devices can detect movement of the end-user 200 from the first monitored environment 202 to the second monitored environment 302 by first detecting movement in the first monitored environment 202, and then, within a threshold time period (e.g., 3 seconds) of that first detection, detecting (i) movement in the second monitored environment 302 and (ii) no movement in the first monitored environment 202. Additionally or alternatively, movement can be detected more granularly. For example, the one or more computing devices can detect movement of the end-user 200 from the first monitored environment 202 to the second monitored environment 302 by first detecting movement in a first sub-region of the first monitored environment 202 (e.g., a predefined sub-region within a threshold distance from a door or other exit leading to the second monitored environment 302), and then, within a threshold time period (e.g., 3 seconds) of that first detection, detecting (i) movement in a second sub-region of the second monitored environment 302 (e.g., a predefined sub-region within a threshold distance from a door or other exit leading to the first monitored environment 202) and (ii) no movement in the first sub-region of the first monitored environment 202. Other examples are possible as well.

In response to detecting the movement of the end-user from the first monitored environment 202 to the second monitored environment 302, the one or more computing devices can trigger a first IoT action at the first IoT device 102 and trigger a second IoT action at the second IoT device 304.

The act of triggering the first IoT action at the first IoT device 102 can involve transmitting, to the first IoT device 102, an instruction for the first IoT device 102 to perform one or more actions corresponding to the first IoT action. Similarly, the act of triggering the second IoT action at the second IoT device 304 can involve transmitting, to the second IoT device 304, an instruction for the second IoT device 304 to perform one or more actions corresponding to the second IoT action.

In some embodiments, the detected movement of the end-user 200 from the first monitored environment 202 to the second monitored environment 302 that triggers the first and second IoT actions can involve the end-user 200 being physically present in the second monitored environment 302. Whereas in other embodiments, the detected movement of the end-user 200 from the first monitored environment 202 to the second monitored environment 302 that triggers the first and second IoT actions can involve the end-user 200 being physically present in the first monitored environment 202 but predicted to be moving to the second monitored environment 302 based on a determination that the end-user 200 is moving in a direction towards the second monitored environment 302 and perhaps additionally based on a determination that the end-user 200 is located within a threshold distance from the second monitored environment 302 and/or moving at a speed that exceeds a threshold speed.

In some cases, the first monitored environment 202 can be a first room in a household and the second monitored environment 302 can be a second room of the household, adjacent to the first room. The following example operations can be usefully applied in this context and in other contexts as well.

In some embodiments, the first IoT device 102 can be or include a first light (e.g., light source 122) and the second IoT device 304 can be or include a second light (e.g., another light source similar to light source 122). In such embodiments, the first IoT action can involve the first IoT device 102 dimming and/or turning off the first light in the first monitored environment 202, and the second IoT action can involve the second IoT device 304 turning on the second light in the second monitored environment 302. This can be useful for quickly and autonomously turning on a light in a room the end-user 200 is headed towards or enters after leaving the previous room.

In some embodiments, the first IoT device 102 can be or include a first audio output device (e.g., media output device 124) and the second IoT device 304 can be or include a second audio output device (e.g., another media output device similar to media output device 124). The first IoT device 102 can be playing audio content in the first monitored environment 202 before detecting the movement of the end-user 200 from the first monitored environment 202 to the second monitored environment 302. As such, the first IoT action can involve the first audio output device fading out or turning off the audio content in the first monitored environment 202, and the second IoT action can involve the second audio output device continuing playback of the audio content in the second monitored environment 302 from a current playback position. The act of continuing playback of the audio content in the second monitored environment 302 can involve having the audio content fading in or turning on beginning at the current playback position, for instance. Thus, as the end-user 200 moves from room to room, the audio content (e.g., a song that the end-user 200 is listening to or audio from a television show the end-user 200 is watching) can follow the end-user 200 from room to room.

Similarly, in some embodiments, the first IoT device 102 can be or include a first video output device (e.g., media output device 124) and the second IoT device 304 can be or include a second video output device (e.g., another media output device similar to media output device 124). The first IoT device 102 can be playing video content in the first monitored environment 202 before detecting the movement of the end-user 200 from the first monitored environment 202 to the second monitored environment 302. As such, the first IoT action can involve the first video output device pausing or turning off the video content in the first monitored environment 202, and the second IoT action can involve the second video output device continuing playback of the video content in the second monitored environment 302 from a current playback position. Thus, as the end-user 200 moves from room to room, the video content (e.g., a television show that the end-user 200 is watching) can follow the end-user 200 from room to room and immediately begin playing in the new room once the end-user 200 enters the new room.

In situations where the second IoT device 304 is not already turned on or is in the standby mode described above when the end-user 200 begins to move toward the second monitored environment 302 or by the time the end-user 200 enters the second monitored environment 302, the second IoT action can additionally involve turning on the second IoT device 304 or switching the second IoT device 304 from operating in the standby mode to instead operating in the active mode.

Further, in some embodiments, the first IoT action in which audio and/or video content is turned off in the first monitored environment 202 can be triggered to occur substantially simultaneously as the second IoT action. However, in other embodiments, it can be useful to have the first IoT action occur a predefined threshold time period (e.g., five seconds) after the one or more computing devices detect that the end-user 200 has entered the second monitored environment 302. This can facilitate a smoother transition of content playout from one room to another.

In addition to having lights, audio, and/or video travel from room to room with the end-user 200, it can also be desirable to maintain any user profile settings associated with the lights, audio, and/or video as the end-user 200 moves from room to room.

Accordingly, in some embodiments, before the first IoT action is triggered, the first IoT device 102 can be performing an action in accordance with one or more settings specified in a profile of the end-user, such as turning on a light, playing audio content, and/or playing video content. The one or more settings can include, by way of example, audio volume settings, light brightness settings, light color settings, and/or video display settings (e.g., brightness level, contrast level, and display mode), among other possibilities. Further, in such embodiments, the second IoT action can involve the second IoT device 304 continuing performance of the action in accordance with the one or more settings specified in the profile of the end-user. Thus, the one or more settings can carry over and effectively follow the end-user 200 to the second monitored environment 302.

In some embodiments, the first IoT action can also involve signing the end-user 200 out of any software applications that were in use by the first IoT device 102 and the second IoT action can also involve signing the end-user 200 into any software applications (e.g., the same software applications or different software applications) that are executable on the second IoT device 304.

If there are multiple end-user profiles stored and accessible via the IoT network 114, the one or more computing devices can determine which profile to select in various ways. For example, if the end-user 200 is signed into a profile on the first IoT device 102 and then moves to the second monitored environment 302, the one or more computing devices can infer that the end-user 200 that moved to the second monitored environment 302 is the same end-user that was signed in to the profile on the first IoT device 102. As another example, and as described above, Wi-Fi data and/or other data can be used to identify specific end-users. For instance, a signal strength of a Bluetooth® connection between the one or more computing devices and a smartphone that the one or more computing devices knows is the end-user's can be used to track movement of the end-user 200 from room to room.

The one or more computing devices can also consider various factors as a basis for predicting, based on the detected movement of the end-user 200 from the first monitored environment 202 to the second monitored environment 302, that the end-user 200 is heading to a third environment, which may or might not be a monitored environment. As such, the one or more computing devices can proactively trigger an IoT action in that third environment.

The third environment can be different from the first monitored environment 202 and the second monitored environment 302. For example, the third environment can be another room in a home of the end-user 200, adjacent to the second monitored environment 302 and such that the end-user 200 might prefer to or need to travel through the second monitored environment 302 in order to get from the first monitored environment 202 to the third environment 402. As another example, the third environment might not be adjacent to the first monitored environment 202 or the second monitored environment 302. For instance, the third environment can be a room that is separated from the second monitored environment 302 by yet another room.

Figure 4:
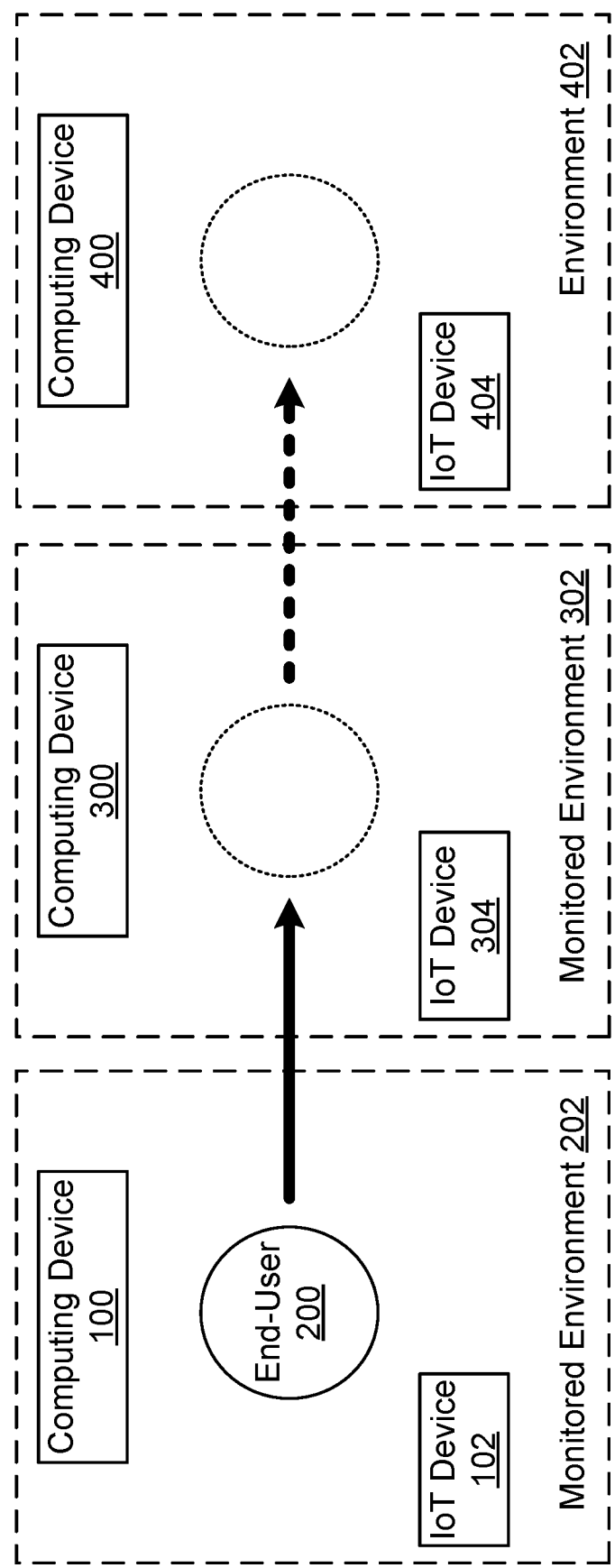
FIG. 4 depicts an example situation in which an end-user moves from a first monitored environment to a second, different monitored environment and is predicted to be heading to a third monitored environment.

FIG. 4 depicts an example situation in which the end-user 200 moves from the first monitored environment 202 to the second monitored environment 302 and is predicted to be heading to a third environment 402. As shown, a third computing device 400 can be located within the third environment 402 and can be monitoring the third environment 402, but it should be understood that in other situations, no such computing device might be present and/or the third environment 402 might not be a monitored environment. As further shown, a third IoT device 404 is located in the third environment 402.

Example operations relating to the situation of FIG. 4 will now be described.

In some embodiments, in response to detecting the movement of the end-user 200 from the first monitored environment 202 to the second monitored environment 302, the one or more computing devices can determine that a condition related to the third environment 402 has been satisfied. And in response to determining that the condition related to the third environment 402 has been satisfied, the one or more computing devices can predict that the end-user 200 is moving from the second monitored environment 302 to the third environment 402.

The condition can take various forms. For example, the condition can be or include a condition that historical end-user movement data indicates past movement of the end-user from the first monitored environment 202, to the second monitored environment 302, and then to the third environment 402. To facilitate this, the one or more computing devices can use Wi-Fi data and/or other types of data over time to monitor and record end-user movement throughout the environments (and perhaps throughout the entire premises).

As another example, the condition can be or include a condition that a predefined virtual map indicates a particular positional relationship between the second monitored environment 302 and the third environment 402 within a larger environment, particularly where the larger environment includes the first monitored environment 202, the second monitored environment 302, and the third environment 402. The larger environment can be the end-user's entire home, for instance.

The predefined virtual map can be a map of the larger environment that is stored and accessible by any of the one or more computing devices via the IoT network 114. Further, the particular positional relationship can be that the second monitored environment 302 and the third environment 402 are adjacent. Alternatively, the particular positional relationship can be that the second monitored environment 302 and the third environment 402 are non-adjacent, but located a particular distance away from each other. Alternatively, the particular positional relationship can be that the second monitored environment 302 and the third environment 402 are on the same floor or on different floors of a building. The predefined virtual map can indicate other positional relationships between other environments within the larger environment as well, and in some cases can also identify where and what type of IoT devices are located within the larger environment.

In response to predicting that the end-user 200 is moving from the second monitored environment 302 to the third environment 402, the one or more computing devices can trigger a third IoT action at the third IoT device 404 located in the third environment 402. For example, the third IoT action can involve turning on lights, audio content, and/or video content, or fading in lights and/or audio content, such as in the manner described above with respect to the second IoT action.

In situations where the third environment 402 is a monitored environment having a computing device (e.g., computing device 400) configured to monitor motion and presence of end-users in the third environment 402 via Wi-Fi, the act of triggering the third IoT action can involve triggering the third IoT action to occur before the computing device 400 detects that the end-user has entered the third environment 402, so as to proactively initiate the third IoT action and improve user experience.

Alternatively, the third environment might not be an environment in which motion and presence of end-users are not being monitored by any computing device via Wi-Fi, and perhaps additionally not being monitored by any computing device using any other types of sensors and sensor data.

In such situations, there can be embodiments in which, in response to detecting the movement of the end-user 200 from the first monitored environment 202 to the second monitored environment 302, the one or more computing devices predict that the end-user 200 is moving from the second monitored environment 302 to the third environment 402 and determine that the third environment 402 is an environment in which motion and presence of end-users are not being monitored by any computing device via Wi-Fi.

The one or more computing devices can predict that the end-user 200 is moving from the second monitored environment 302 to the third environment 402 in various ways, such as based on Wi-Fi data or other data, or based on a determination that the condition related to the third environment 402 has been satisfied as described above.

To determine that the third environment 402 is an environment in which motion and presence of end-users are not being monitored by any computing device via Wi-Fi, the one or more computing devices can refer to data stored in memory that indicates whether the third environment 402 is such an environment. For example, the one or more computing devices can refer to the predefined virtual map described above, which might include an indicator as to which environments in a larger environment are monitored environments. As another example, the one or more computing devices can refer to mapping data that maps each of a plurality of environments to corresponding information related to that environment, such as whether that environment is a monitored environment, whether an IoT device is currently located in that environment, and/or what type of IoT device or computing devices on the IoT network 114 is/are currently located in that environment. Other examples are possible as well.

In response to predicting that the end-user is moving from the second monitored environment 302 to the third environment 402 and further in response to determining that the third environment 402 is an environment in which motion and presence of end-users are not being monitored by any computing device via Wi-Fi, the one or more computing devices can trigger a third IoT action at the third IoT device 404 located in the third environment 402, such as in the manner described above.

In some embodiments, the one or more computing devices can use machine learning algorithms to learn end-user behavior over time, such as based on a history of detected presence and movement throughout a home, and then use that knowledge as a basis to proactively trigger IoT actions in a room ahead of time before the end-user 200 enters that room.

C. Using Motion and Presence of an End-User in and Out of a Monitored Environment to Trigger an Action at an IoT Device The following operations relate to using motion and presence of an end-user—namely, movement of the end-user out of, and subsequently back into, a monitored environment—to trigger an action at an IoT device.

Figure 5:
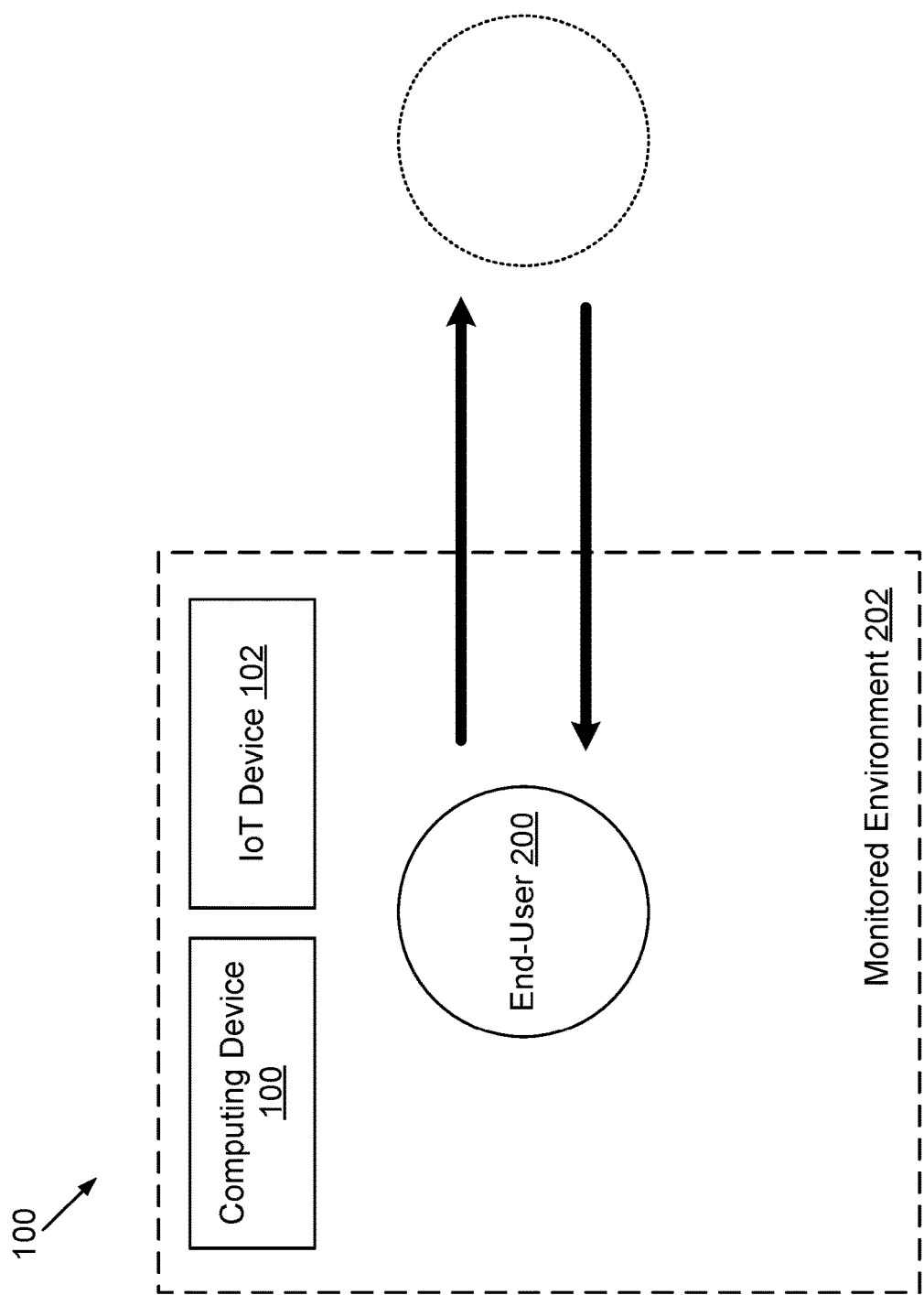
FIG. 5 depicts an example situation in which an end-user . . . .

FIG. 5 depicts an example situation in which an end-user 200 exits and subsequently reenters the monitored environment 202 of the computing device 100. As shown, the IoT device 102 is located within the monitored environment 202, but in some situations the IoT device 102 might be located outside of the monitored environment 202.

The computing device 100 can use the Wi-Fi module 112 to detect that the end-user 200 has exited the monitored environment 202 of the computing device 100, such as by using any Wi-Fi-based motion/presence detection process now known or later developed.

In response to detecting that the end-user 200 has exited the monitored environment of the computing device 100, the computing device 100 can trigger a first IoT action at the IoT device 102.

Then, after detecting that the end-user 200 has exited the monitored environment 202 of the computing device 100 and triggering the first IoT action, the computing device 100 can use the Wi-Fi module 112 to detect that the end-user 200 has reentered the monitored environment 202 of the computing device 100, such as by using any Wi-Fi-based motion/presence detection process now known or later developed.

In response to detecting that the end-user has reentered the monitored environment 202 of the computing device 100, the computing device 100 can trigger a second IoT action at the IoT device 102.

The act of triggering the first IoT action at the IoT device 102 can involve transmitting, to the IoT device 102, an instruction for the IoT device 102 to perform one or more actions corresponding to the first IoT action. Similarly, the act of triggering the second IoT action at the IoT device 102 can involve transmitting, to the IoT device 102, an instruction for the IoT device 102 to perform one or more actions corresponding to the second IoT action. Further, the computing device 100 can trigger the first IoT action and/or the second IoT action without receiving manual input (e.g., a voice command or button pressed on a remote controller) from the end-user 200.

In some embodiments, the IoT device 102 can be or include a media output device (e.g., media output device 124) that is playing media content (e.g., live media content or media content that is not live) in the monitored environment 202 before the computing device 100 detects that the end-user 200 has exited the monitored environment 202.

As such, the first IoT action can involve the IoT device 102 pausing the media content, and the second IoT action can involve the IoT device 102 resuming the media content. By way of example, the IoT device 102 can be a television set in the end-user's living room and the computing device 100 can be a set-top box in the living room and connected to the television set. Once the computing device 100 detects that the end-user 200 has exited the living room, the computing device 100 can trigger the set-top box to pause the television show that the end-user 200 was watching, and once the computing device 100 detects that the end-user 200 has reentered the living room, the computing device 100 can trigger the set-top box to resume the television show at the playback position at which the show was paused.

Alternatively, the first IoT action can involve the IoT device 102 (i) storing a playback position of the media content corresponding to a time point at which the detection is made that the end-user 200 has exited the monitored environment 202 and (ii) continuing to play the media content. And the second IoT action can involve the IoT device 102 rewinding the media content to the playback position or the IoT device 102 displaying, via the media output device, a graphical user interface element that, when selected by the end-user 200, triggers the IoT device 102 to rewind the media content to the stored playback position. That is, responsive to the end-user 200 reentering the monitored environment 202, the IoT device 102 can either automatically rewind the media content or provide the end-user 200 with a selectable option to rewind the media content.

Furthermore, in some situations where the media content being played out is live media content, the first IoT action can involve recording the live media content as the IoT device 102 continues to play the live media content, and the second IoT action can involve the IoT device 102 displaying a graphical user interface element that, when selected by the end-user 200, triggers the IoT device 102 to play the recording of the live media content. That is, responsive to the end-user 200 reentering the monitored environment 202, the IoT device 102 can provide the end-user 200 with a selectable option to watch the recording of the media content that the end-user 200 might have missed when the end-user 200 was out of the room.

D. Using Motion and Presence of an End-User to Control a Pause Mode of an IoT Device In some situations, when an end-user is watching or listening to media content for a certain period of time, a playback device that is playing out the media content can prompt the end-user to confirm whether the end-user is still present and still intending to watch or listen to the media content. However, such a prompt can be disruptive to user experience.

Thus, in some embodiments, motion and presence of the end-user can advantageously be used to control when such a prompt is displayed, such as by disabling a mode of operation of the IoT device in which the prompt is displayed, or by controlling the timing at which the prompt is displayed.

By way of example, while the IoT device 102 in the monitored environment 202 of the computing device 100 is playing out media content, the computing device 100 can use the Wi-Fi module 112 to detect that the end-user 200 is present in the monitored environment 202, such as by using any Wi-Fi-based motion/presence detection process now known or later developed. The IoT device 102 can be configured by default to operate in a first mode in which after a predefined time period (e.g., one hour) has passed without the IoT device receiving end-user input (e.g., remote controller input), the IoT device 102 displays a prompt for the end-user 200 to indicate whether the end-user 200 is present. In response to detecting the predefined time period has passed without the IoT device 102 receiving end-user input, and further in response to detecting that the end-user is present in the monitored environment 202 while the IoT device 102 is playing out the media content, the computing device 100 can trigger the IoT device 102 to switch from operating in the first mode to instead operating in a second mode in which the IoT device 102 does not display the prompt for the end-user to indicate whether the end-user is present.

As another example, while the IoT device 102 in the monitored environment 202 of the computing device 100 is playing out media content, the computing device 100 can (i) use the Wi-Fi module 112 to detect that the end-user 200 is present in the monitored environment 202 and (ii) while detecting that the end-user 200 is present in the monitored environment 202, detect that a predefined time period has passed without the IoT device 102 receiving end-user input. In response to detecting that the end-user 200 is present in the monitored environment 202 and further in response to detecting that the predefined time period has passed without the IoT device 102 receiving end-user input, the computing device 100 can trigger the IoT device 102 to display a prompt for the end-user 200 to indicate whether the end-user 200 is present.

E. Example Methods

Figure 6:
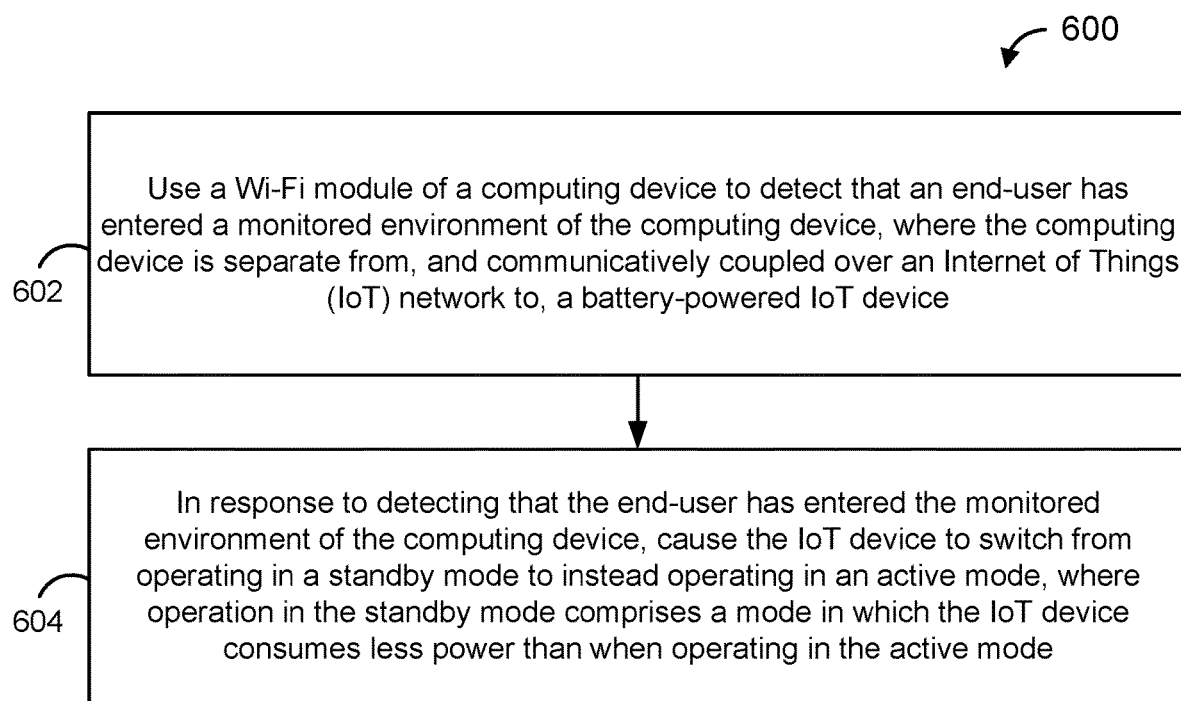
FIG. 6 is a flow chart of an example method.

FIG. 6 is a flow chart of an example method 600. At block 602, the method 600 includes using a Wi-Fi module of a computing device to detect that an end-user has entered a monitored environment of the computing device, where the computing device is separate from, and communicatively coupled over an Internet of Things (IoT) network to, a battery-powered IoT device.

At block 604, the method 600 includes in response to detecting that the end-user has entered the monitored environment of the computing device, causing the IoT device to switch from operating in a standby mode to instead operating in an active mode, wherein operation in the standby mode comprises a mode in which the IoT device consumes less power than when operating in the active mode.

In some embodiments, the method 600 is performed while the computing device is electrically connected to a wall outlet.

In some embodiments, the computing device can include a set-top box.

In some embodiments, the IoT device is a remote controller.

In some embodiments, the IoT device can include an actuator device, operation in the active mode can involve a mode in which the IoT device is configured to perform a first action in response to detecting actuation of the actuator device, operation in the standby mode further can involve a mode in which the IoT device is configured to perform a second action, different from the first action, in response to detecting actuation of the actuator device, and the second action can involve switching from operating in the standby mode to instead operating in the active mode.

In some embodiments, the IoT device can include an actuator device and a backlight disposed underneath the actuator device, operation in the standby mode further can involve a mode in which the backlight is turned off, and operation in the active mode can involve a mode in which the backlight is turned on.

In some embodiments, the IoT device can include a microphone, operation in the standby mode further can involve a mode in which the IoT device is configured to perform an action in response to the microphone detecting a volume level of an incoming acoustic signal that is higher than a first predefined volume threshold, operation in the active mode can involve a mode in which the IoT device is configured to perform the action in response to the microphone detecting a volume level of an incoming acoustic signal that is higher than a second predefined volume threshold, and the second predefined volume threshold is higher than the first predefined volume threshold.

In some embodiments, the IoT device can include a motion sensor, the motion sensor is a gyroscope or an accelerometer, operation in the standby mode further can involve a mode in which the IoT device is configured to perform an action in response to the motion sensor detecting a motion signal that exceeds a first predefined motion threshold, and operation in the active mode can involve a mode in which the IoT device is configured to perform the action in response to the motion sensor detecting a motion signal that exceeds a second predefined motion threshold that is higher than the first predefined motion threshold.

In some embodiments, operation in the standby mode further can involve a mode in which the IoT device periodically wakes up at a first frequency to perform an action that facilitates identifying a location of the IoT device within the monitored environment to the end-user, and operation in the active mode can involve a mode in which the IoT device periodically wakes up at a second frequency, higher than the first frequency, to perform the action that facilitates identifying the location of the IoT device within the monitored environment to the end-user.

In some embodiments, the IoT device is a camera, operation in the standby mode further can involve a mode in which the camera is not recording footage of a camera-monitored environment, and operation in the active mode can involve a mode in which the camera is recording footage of the camera-monitored environment. In some cases, the camera-monitored environment and the monitored environment are the same environment. In other cases, the camera-monitored environment and the monitored environment are different environments.

In some embodiments, the act of causing the IoT device to switch from operating in the standby mode to instead operating in the active mode can involve transmitting, to the IoT device, an instruction for the IoT device to switch from operating in the standby mode to instead operating in the active mode.

In some embodiments, the monitored environment of the computing device can include the IoT device.

In some embodiments, the IoT device is located outside of the monitored environment of the computing device.

Figure 7:
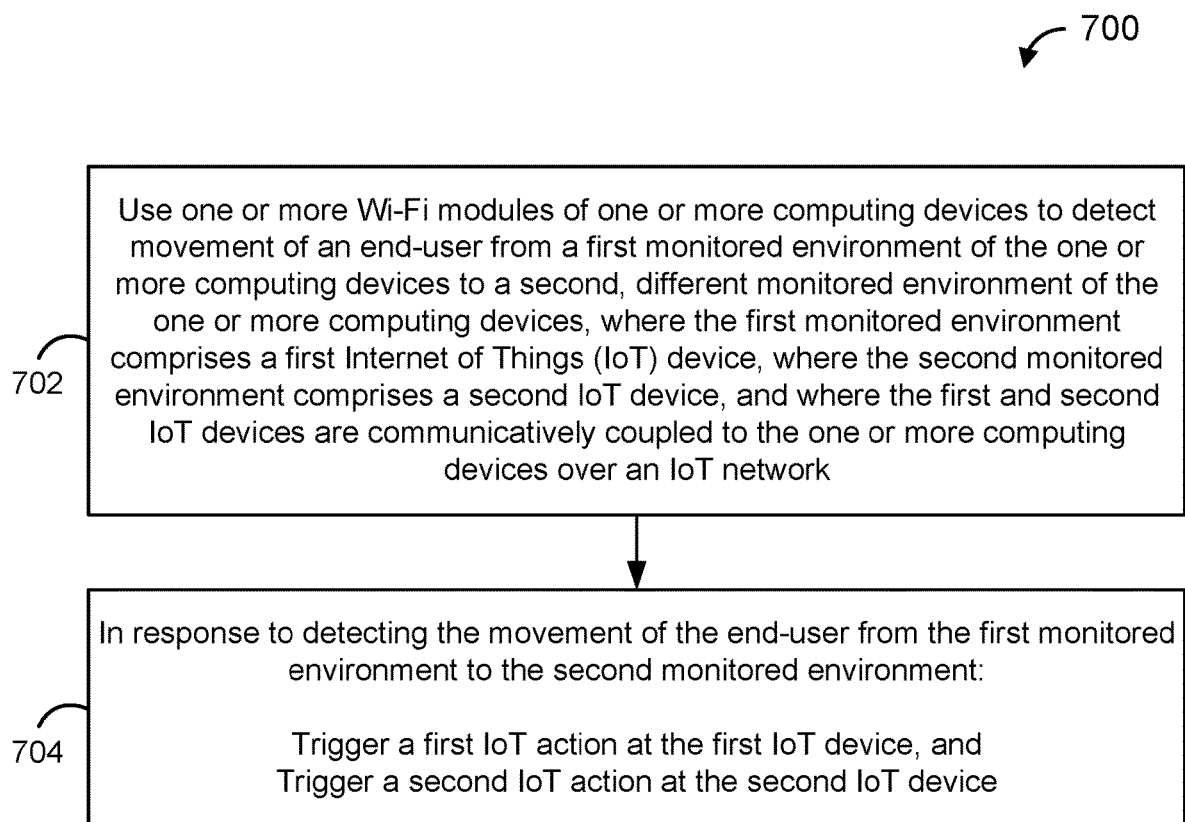
FIG. 7 is a flow chart of another example method.

FIG. 7 is a flow chart of an example method 700. At block 702, the method 700 includes using one or more Wi-Fi modules of one or more computing devices to detect movement of an end-user from a first monitored environment of the one or more computing devices to a second, different monitored environment of the one or more computing devices, where the first monitored environment comprises a first Internet of Things (IoT) device, where the second monitored environment comprises a second IoT device, and where the first and second IoT devices are communicatively coupled to the one or more computing devices over an IoT network.

At block 704, the method 700 includes in response to detecting the movement of the end-user from the first monitored environment to the second monitored environment: triggering a first IoT action at the first IoT device, and triggering a second IoT action at the second IoT device.

In some embodiments, the first monitored environment is a first room of a household, and the second monitored environment is a second room of the household, adjacent to the first room.

In some embodiments, the first IoT device comprises a first light, the second IoT device comprises a second light, the first IoT action can involve one or more of dimming or turning off the first light in the first monitored environment, and the second IoT action can involve turning on the second light in the second monitored environment.

In some embodiments, the first IoT device can include a first audio output device that is playing audio content in the first monitored environment before detecting the movement of the end-user from the first monitored environment to the second monitored environment, the second IoT device can include a second audio output device, the first IoT action can involve the first audio output device fading out or turning off the audio content in the first monitored environment, and the second IoT action can involve the second audio output device continuing playback of the audio content in the second monitored environment from a current playback position.

In some embodiments, the first IoT device can include a first video output device that is playing video content in the first monitored environment before detecting the movement of the end-user from the first monitored environment to the second monitored environment, the second IoT device can include a second video output device, the first IoT action can involve the first video output device pausing or turning off the video content in the first monitored environment, and the second IoT action can involve the second video output device continuing playback of the video content in the second monitored environment from a current playback position.

In some embodiments, before the first IoT action is triggered, the first IoT device is performing an action in accordance with one or more settings specified in a profile of the end-user. Further, in such embodiments, the second IoT action can involve the second IoT device continuing performance of the action in accordance with the one or more settings specified in the profile of the end-user. In some examples, the one or more settings include one or more of: audio volume settings, light brightness settings, or light color settings.

In some embodiments, the method 700 also can include in response to detecting the movement of the end-user from the first monitored environment to the second monitored environment: determining that a condition related to a third environment has been satisfied, and in response to determining that the condition related to the third environment has been satisfied, predicting that the end-user is moving from the second monitored environment to the third environment. The method 700 also can include in response to predicting that the end-user is moving from the second monitored environment to the third environment, triggering a third IoT action at a third IoT device located in the third environment. In some cases, the condition can be that historical end-user movement data indicates past movement of the end-user from the first monitored environment, to the second monitored environment, and then to the third environment. Further, the condition can be that a predefined virtual map indicates a particular positional relationship between the second monitored environment and the third environment within a larger environment. In addition, the larger environment can include the first and second monitored environments and the third environment. In other cases, the third environment can be a third monitored environment including a computing device configured to monitor motion and presence of end-users in the third environment via Wi-Fi, and the act of trigging the third IoT action can involve triggering the third IoT action to occur before the computing device detects that the end-user has entered the third environment.

In some embodiments, the method 700 also can include in response to detecting the movement of the end-user from the first monitored environment to the second monitored environment: predicting that the end-user is moving from the second monitored environment to a third environment, different from the first and second monitored environments, and determining that the third environment is an environment in which motion and presence of end-users are not being monitored by any computing device via Wi-Fi. The method 700 also can include in response to predicting that the end-user is moving from the second monitored environment to the third environment and further in response to determining that the third environment is an environment in which motion and presence of end-users are not being monitored by any computing device via Wi-Fi, triggering a third IoT action at a third IoT device located in the third environment.

In some embodiments, the act of triggering the first IoT action at the first IoT device can involve transmitting, to the first IoT device, an instruction for the first IoT device to perform one or more actions corresponding to the first IoT action, and the act of triggering the second IoT action at the second IoT device can involve transmitting, to the second IoT device, an instruction for the second IoT device to perform one or more actions corresponding to the second IoT action.

Figure 8:
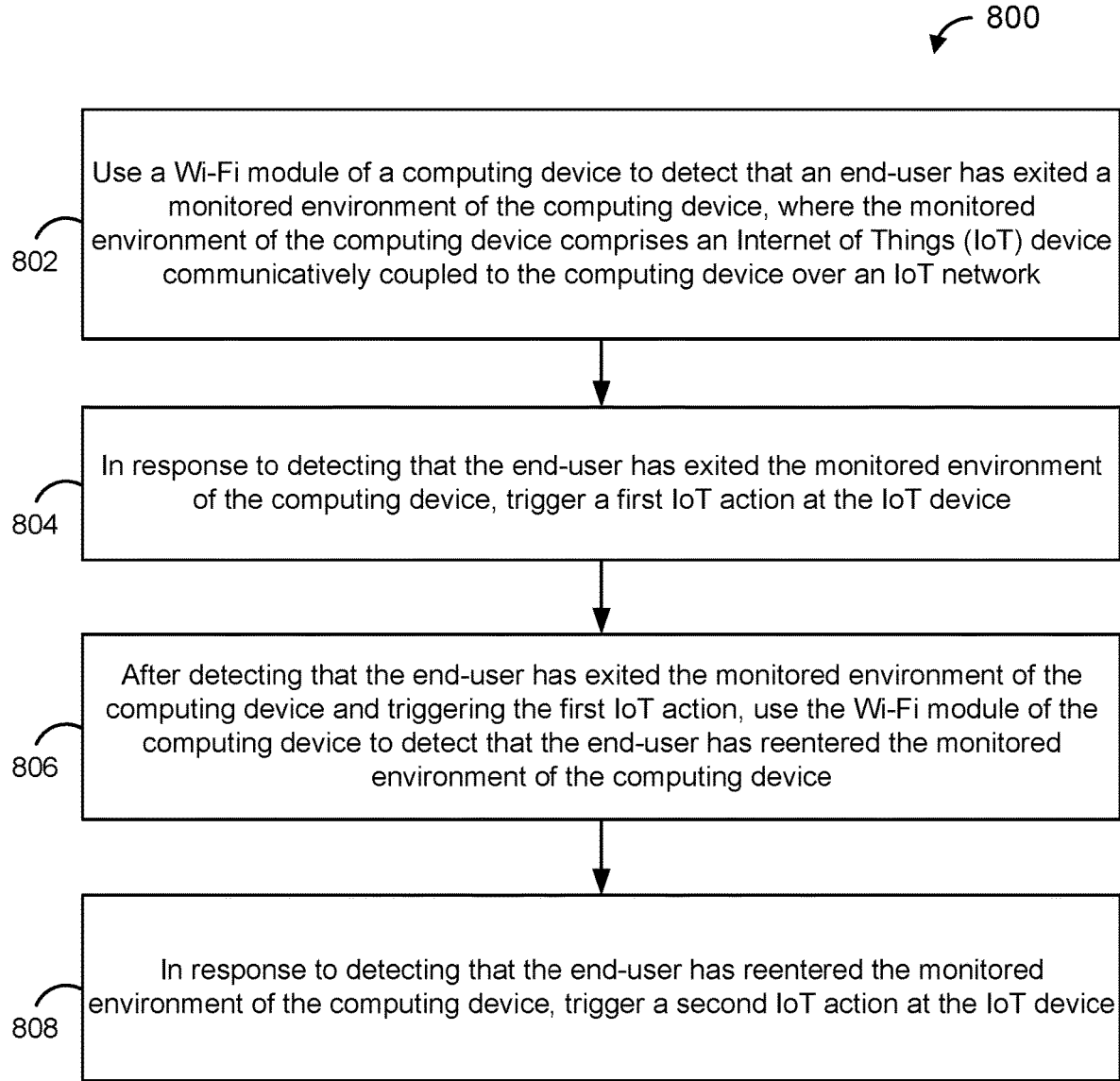
FIG. 8 is a flow chart of another example method.

FIG. 8 is a flow chart of an example method 800. At block 802, the method 800 includes using a Wi-Fi module of a computing device to detect that an end-user has exited a monitored environment of the computing device, where the monitored environment of the computing device comprises an Internet of Things (IoT) device communicatively coupled to the computing device over an IoT network.

At block 804, the method 800 includes in response to detecting that the end-user has exited the monitored environment of the computing device, triggering a first IoT action at the IoT device.

At block 806, the method 800 includes after detecting that the end-user has exited the monitored environment of the computing device and triggering the first IoT action, using the Wi-Fi module of the computing device to detect that the end-user has reentered the monitored environment of the computing device.

At block 808, the method 800 includes in response to detecting that the end-user has reentered the monitored environment of the computing device, triggering a second IoT action at the IoT device.

In some embodiments, the act of triggering the first and second IoT actions can involve triggering the first and second IoT actions without receiving manual input from the end-user.

In some embodiments, the IoT device can include a media output device that is playing media content in the monitored environment before detecting that the end-user has exited the monitored environment of the computing device, the first IoT action can involve the IoT device pausing the media content, and the second IoT action can involve the IoT device resuming the media content.

In some embodiments, the IoT device can include a media output device that is playing media content in the monitored environment before detecting that the end-user has exited the monitored environment of the computing device, the first IoT action can involve the IoT device (i) storing a playback position of the media content corresponding to a time point at which the detection is made that the end-user has exited the monitored environment of the computing device and (ii) continuing to play the media content, and the second IoT action can involve the IoT device rewinding the media content to the playback position.

In some embodiments, the IoT device can include a media output device that is playing media content in the monitored environment before detecting that the end-user has exited the monitored environment of the computing device, the first IoT action can involve the IoT device (i) storing a playback position of the media content corresponding to a time point at which the detection is made that the end-user has exited the monitored environment of the computing device and (ii) continuing to play the media content, and the second IoT action can involve the IoT device displaying a graphical user interface element that, when selected by the end-user, triggers the IoT device to rewind the media content to the stored playback position.

In some embodiments, the IoT device can include a media output device that is playing live media content in the monitored environment before detecting that the end-user has exited the monitored environment of the computing device, the first IoT action can involve recording the live media content as the IoT device continues to play the live media content, and the second IoT action can involve the IoT device displaying a graphical user interface element that, when selected by the end-user, triggers the IoT device to play the recording of the live media content.

In some embodiments, the act of triggering the first IoT action at the IoT device can involve transmitting, to the IoT device, an instruction for the IoT device to perform one or more actions corresponding to the first IoT action, and the act of triggering the second IoT action at the IoT device can involve transmitting, to the second IoT device, an instruction for the IoT device to perform one or more actions corresponding to the second IoT action.

Figure 9:
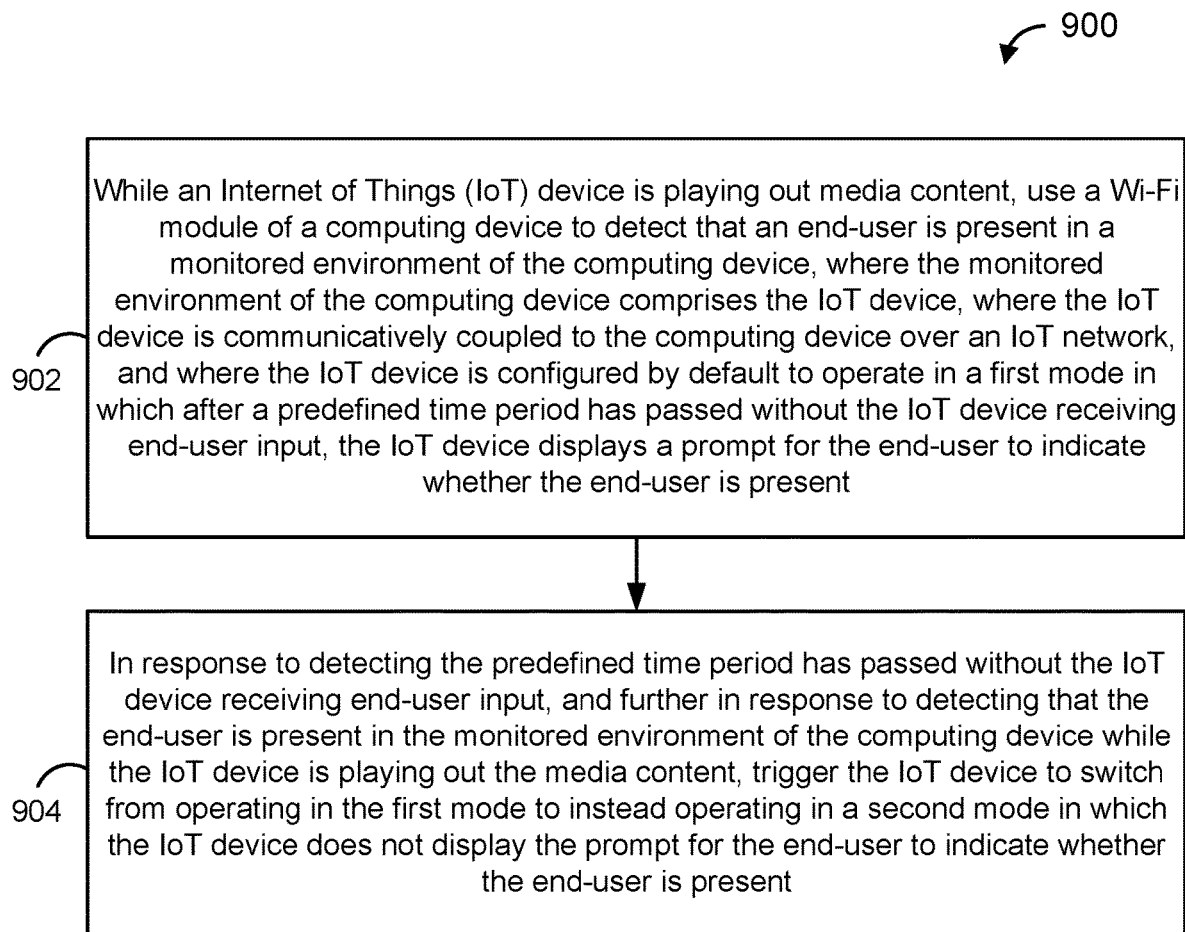
FIG. 9 is a flow chart of another example method.

FIG. 9 is a flow chart of an example method 900. At block 902, the method 900 includes while an Internet of Things (IoT) device is playing out media content, using a Wi-Fi module of a computing device to detect that an end-user is present in a monitored environment of the computing device, where the monitored environment of the computing device comprises the IoT device, where the IoT device is communicatively coupled to the computing device over an IoT network, and where the IoT device is configured by default to operate in a first mode in which after a predefined time period has passed without the IoT device receiving end-user input, the IoT device displays a prompt for the end-user to indicate whether the end-user is present.

At block 904, the method 900 includes in response to detecting the predefined time period has passed without the IoT device receiving end-user input, and further in response to detecting that the end-user is present in the monitored environment of the computing device while the IoT device is playing out the media content, triggering the IoT device to switch from operating in the first mode to instead operating in a second mode in which the IoT device does not display the prompt for the end-user to indicate whether the end-user is present.

Figure 10:
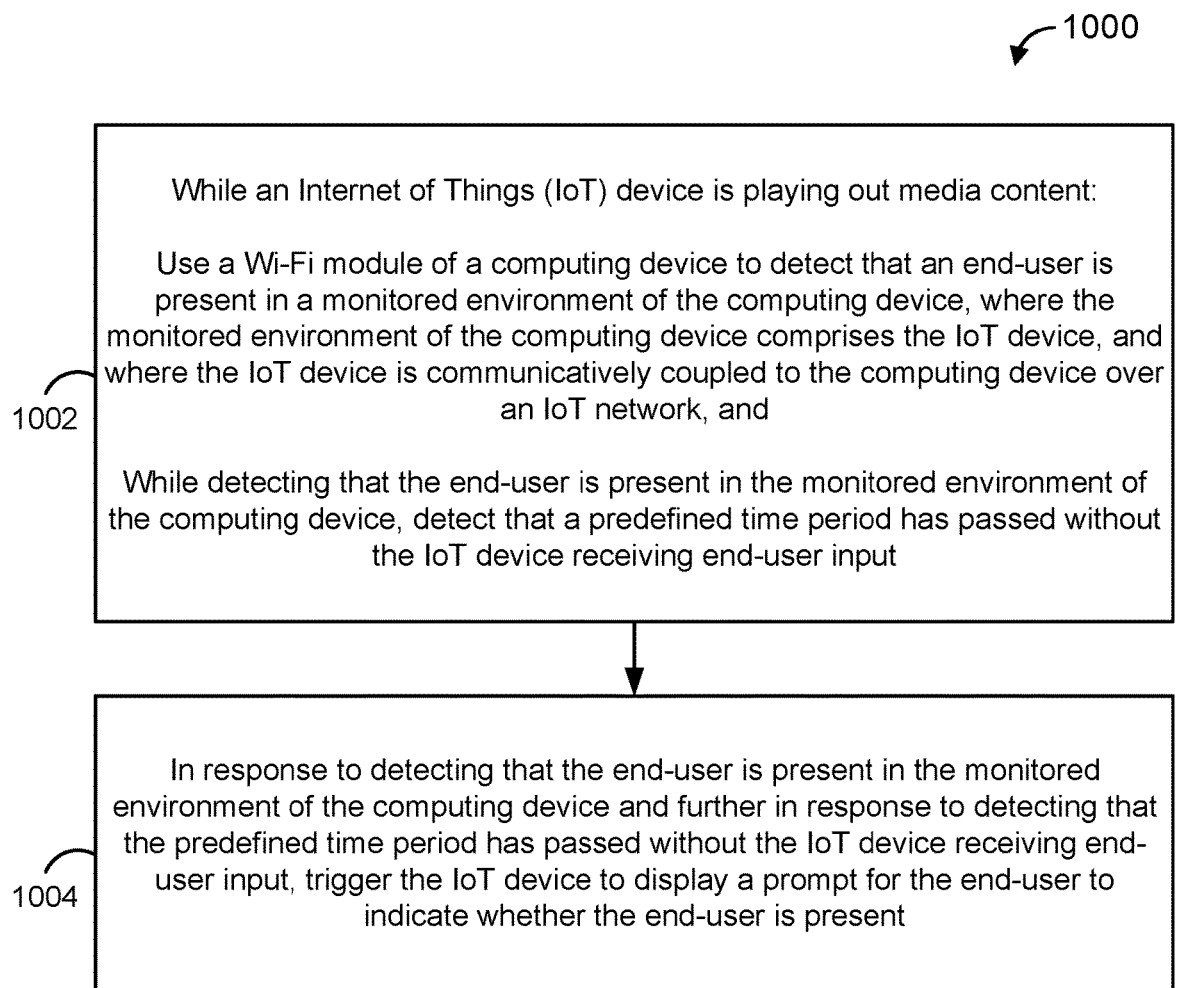
FIG. 10 is a flow chart of another example method.

FIG. 10 is a flow chart of an example method 1000. At block 1002, the method 1000 includes while an Internet of Things (IoT) device is playing out media content: using a Wi-Fi module of a computing device to detect that an end-user is present in a monitored environment of the computing device, where the monitored environment of the computing device comprises the IoT device, and where the IoT device is communicatively coupled to the computing device over an IoT network, and while detecting that the end-user is present in the monitored environment of the computing device, detecting that a predefined time period has passed without the IoT device receiving end-user input.

At block 1004, the method 1000 includes in response to detecting that the end-user is present in the monitored environment of the computing device and further in response to detecting that the predefined time period has passed without the IoT device receiving end-user input, triggering the IoT device to display a prompt for the end-user to indicate whether the end-user is present.

IV. Example Variations

Although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:

using a Wi-Fi module of a computing device to detect that an end-user has exited a monitored environment of the computing device, wherein the monitored environment of the computing device comprises an Internet of Things (IoT) device communicatively coupled to the computing device over an IoT network, wherein using the Wi-Fi module to detect that the end-user has exited the monitored environment comprises analyzing characteristics of a Wi-Fi signal transmitted from and received by the Wi-Fi module of the computing device;

in response to detecting that the end-user has exited the monitored environment of the computing device, triggering a first IoT action at the IoT device;

after detecting that the end-user has exited the monitored environment of the computing device and triggering the first IoT action, using the Wi-Fi module of the computing device to detect that the end-user has reentered the monitored environment of the computing device, wherein using the Wi-Fi module to detect that the end-user has reentered the monitored environment comprises analyzing characteristics of a Wi-Fi signal; and in response to detecting that the end-user has reentered the monitored environment of the computing device, triggering a second IoT action at the IoT device.

2. The method of claim 1, wherein triggering the first and second IoT actions comprises triggering the first and second IoT actions without receiving manual input from the end-user.

3. The method of claim 1, wherein:

the IoT device comprises a media output device that is playing media content in the monitored environment before detecting that the end-user has exited the monitored environment of the computing device, the first IoT action comprises the IoT device pausing the media content, and the second IoT action comprises the IoT device resuming the media content.

4. The method of claim 1, wherein:

the IoT device comprises a media output device that is playing media content in the monitored environment before detecting that the end-user has exited the monitored environment of the computing device, the first IoT action comprises the IoT device (i) storing a playback position of the media content corresponding to a time point at which the detection is made that the end-user has exited the monitored environment of the computing device and (ii) continuing to play the media content, and the second IoT action comprises the IoT device rewinding the media content to the playback position.

5. The method of claim 1, wherein:

the IoT device comprises a media output device that is playing media content in the monitored environment before detecting that the end-user has exited the monitored environment of the computing device, the first IoT action comprises the IoT device (i) storing a playback position of the media content corresponding to a time point at which the detection is made that the end-user has exited the monitored environment of the computing device and (ii) continuing to play the media content, and the second IoT action comprises the IoT device displaying a graphical user interface element that, when selected by the end-user, triggers the IoT device to rewind the media content to the stored playback position.

6. The method of claim 1, wherein:
the IoT device comprises a media output device that is playing live media content in the monitored environment before detecting that the end-user has exited the monitored environment of the computing device,
the first IoT action comprises recording the live media content as the IoT device continues to play the live media content, and
the second IoT action comprises the IoT device displaying a graphical user interface element that, when selected by the end-user, triggers the IoT device to play the recording of the live media content.

7. The method of claim 1, wherein:
triggering the first IoT action at the IoT device comprises transmitting, to the IoT device, an instruction for the IoT device to perform one or more actions corresponding to the first IoT action, and
triggering the second IoT action at the IoT device comprises transmitting, to the IoT device, an instruction for the IoT device to perform one or more actions corresponding to the second IoT action.

8. A non-transitory computer-readable storage medium, having stored thereon program instructions that, upon execution by a processor, cause performance of a set of operations comprising:
using a Wi-Fi module of a computing device to detect that an end-user has exited a monitored environment of the computing device, wherein the monitored environment of the computing device comprises an Internet of Things (IoT) device communicatively coupled to the computing device over an IoT network;
in response to detecting that the end-user has exited the monitored environment of the computing device, triggering a first IoT action at the IoT device, wherein using the Wi-Fi module to detect that the end-user has exited the monitored environment comprises analyzing characteristics of a Wi-Fi signal transmitted from and received by the Wi-Fi module of the computing device;
after detecting that the end-user has exited the monitored environment of the computing device and triggering the first IoT action, using the Wi-Fi module of the computing device to detect that the end-user has reentered the monitored environment of the computing device, wherein using the Wi-Fi module to detect that the end-user has reentered the monitored environment comprises analyzing characteristics of a Wi-Fi signal; and
in response to detecting that the end-user has reentered the monitored environment of the computing device, triggering a second IoT action at the IoT device.

9. The non-transitory computer-readable storage medium of claim 8, wherein triggering the first and second IoT actions comprises triggering the first and second IoT actions without receiving manual input from the end-user.

10. The non-transitory computer-readable storage medium of claim 8, wherein:
the IoT device comprises a media output device that is playing media content in the monitored environment before detecting that the end-user has exited the monitored environment of the computing device,
the first IoT action comprises the IoT device pausing the media content, and
the second IoT action comprises the IoT device resuming the media content.

11. The non-transitory computer-readable storage medium of claim 8, wherein:
the IoT device comprises a media output device that is playing media content in the monitored environment before detecting that the end-user has exited the monitored environment of the computing device,
the first IoT action comprises the IoT device (i) storing a playback position of the media content corresponding to a time point at which the detection is made that the end-user has exited the monitored environment of the computing device and (ii) continuing to play the media content, and
the second IoT action comprises the IoT device rewinding the media content to the playback position.

12. The non-transitory computer-readable storage medium of claim 8, wherein:
the IoT device comprises a media output device that is playing media content in the monitored environment before detecting that the end-user has exited the monitored environment of the computing device,
the first IoT action comprises the IoT device (i) storing a playback position of the media content corresponding to a time point at which the detection is made that the end-user has exited the monitored environment of the computing device and (ii) continuing to play the media content, and
the second IoT action comprises the IoT device displaying a graphical user interface element that, when selected by the end-user, triggers the IoT device to rewind the media content to the stored playback position.

13. The non-transitory computer-readable storage medium of claim 8, wherein:
the IoT device comprises a media output device that is playing live media content in the monitored environment before detecting that the end-user has exited the monitored environment of the computing device,
the first IoT action comprises recording the live media content as the IoT device continues to play the live media content, and
the second IoT action comprises the IoT device displaying a graphical user interface element that, when selected by the end-user, triggers the IoT device to play the recording of the live media content.

14. The non-transitory computer-readable storage medium of claim 8, wherein:
triggering the first IoT action at the IoT device comprises transmitting, to the IoT device, an instruction for the IoT device to perform one or more actions corresponding to the first IoT action, and
triggering the second IoT action at the IoT device comprises transmitting, to the IoT device, an instruction for the IoT device to perform one or more actions corresponding to the second IoT action.

15. A system comprising:
a processor; and
a non-transitory computer-readable storage medium, having stored thereon program instructions that, upon execution by the processor, cause performance of a set of operations comprising:
using a Wi-Fi module of a computing device to detect that an end-user has exited a monitored environment of the computing device, wherein the monitored environment of the computing device comprises an Internet of Things (IoT) device communicatively coupled to the computing device over an IoT network;

in response to detecting that the end-user has exited the monitored environment of the computing device, triggering a first IoT action at the IoT device, wherein using the Wi-Fi module to detect that the end-user has exited the monitored environment comprises analyzing characteristics of a Wi-Fi signal transmitted from and received by the Wi-Fi module of the computing device;

after detecting that the end-user has exited the monitored environment of the computing device and triggering the first IoT action, using the Wi-Fi module of the computing device to detect that the end-user has reentered the monitored environment of the computing device, wherein using the Wi-Fi module to detect that the end-user has reentered the monitored environment comprises analyzing characteristics of a Wi-Fi signal; and in response to detecting that the end-user has reentered the monitored environment of the computing device, triggering a second IoT action at the IoT device.

16. The system of claim 15, wherein triggering the first and second IoT actions comprises triggering the first and second IoT actions without receiving manual input from the end-user.

17. The system of claim 15, wherein:

the IoT device comprises a media output device that is playing media content in the monitored environment before detecting that the end-user has exited the monitored environment of the computing device, the first IoT action comprises the IoT device pausing the media content, and the second IoT action comprises the IoT device resuming the media content.

18. The system of claim 15, wherein:

the IoT device comprises a media output device that is playing media content in the monitored environment before detecting that the end-user has exited the monitored environment of the computing device, the first IoT action comprises the IoT device (i) storing a playback position of the media content corresponding to a time point at which the detection is made that the end-user has exited the monitored environment of the computing device and (ii) continuing to play the media content, and the second IoT action comprises the IoT device rewinding the media content to the playback position.

19. The system of claim 15, wherein:

the IoT device comprises a media output device that is playing media content in the monitored environment before detecting that the end-user has exited the monitored environment of the computing device, the first IoT action comprises the IoT device (i) storing a playback position of the media content corresponding to a time point at which the detection is made that the end-user has exited the monitored environment of the computing device and (ii) continuing to play the media content, and the second IoT action comprises the IoT device displaying a graphical user interface element that, when selected by the end-user, triggers the IoT device to rewind the media content to the stored playback position.

20. The system of claim 15, wherein:

the IoT device comprises a media output device that is playing live media content in the monitored environment before detecting that the end-user has exited the monitored environment of the computing device, the first IoT action comprises recording the live media content as the IoT device continues to play the live media content, and the second IoT action comprises the IoT device displaying a graphical user interface element that, when selected by the end-user, triggers the IoT device to play the recording of the live media content.

\* \* \* \* \*